United States Patent
King

(10) Patent No.: US 10,043,154 B2
(45) Date of Patent: *Aug. 7, 2018

(54) PROCESSING CONTAINER IMAGES AND IDENTIFIERS USING OPTICAL CHARACTER RECOGNITION AND GEOLOCATION

(71) Applicant: HKI Systems and Service LLC, Moraga, CA (US)

(72) Inventor: Henry S King, Moraga, CA (US)

(73) Assignee: HKI Systems and Service LLC, Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/484,070

(22) Filed: Apr. 10, 2017

(65) Prior Publication Data

US 2017/0220989 A1    Aug. 3, 2017

Related U.S. Application Data

(63) Continuation of application No. 14/875,906, filed on Oct. 6, 2015, now Pat. No. 9,619,725, which is a continuation of application No. 14/017,078, filed on Sep. 3, 2013, now Pat. No. 9,177,210, which is a continuation-in-part of application No. 13/422,442, filed on Mar. 16, 2012, now Pat. No. 8,720,777, which is a continuation of application No.
(Continued)

(51) Int. Cl.
| | | |
|---|---|---|
| G06F 19/00 | (2018.01) | |
| G06Q 10/08 | (2012.01) | |
| G06K 9/34 | (2006.01) | |
| G06K 9/03 | (2006.01) | |
| G06K 19/06 | (2006.01) | |
| H04N 5/225 | (2006.01) | |

(52) U.S. Cl.
CPC .......... G06Q 10/087 (2013.01); G06K 9/033 (2013.01); G06K 9/344 (2013.01); G06K 19/06028 (2013.01); G06K 2209/01 (2013.01); G06K 2209/19 (2013.01); G06K 2209/27 (2013.01); H04N 5/2257 (2013.01)

(58) Field of Classification Search
CPC ....... G06Q 10/087; G06Q 10/08; G06Q 10/06
USPC .................................................. 235/385, 375
See application file for complete search history.

(56) References Cited

U.S. PATENT DOCUMENTS 9,177,210 B2 * 11/2015 King ..................... B66F 9/0755

* cited by examiner

Primary Examiner — Ahshik Kim
(74) Attorney, Agent, or Firm — Staniford Tomita LLP

(57) ABSTRACT

Embodiments include a system configured to process location information for objects in a site comprising an imaging device configured to take a picture of an object, the picture containing a unique identifier of the object; a global positioning system (GPS) component associated with the imaging device and configured to tag the image of the object with GPS location information of the object to generate a tagged image; a communications interface configured to transmit the tagged image to a server computer remote from the imaging device over an Internet Protocol (IP) network; and a processor of the server configured to perform Optical Character Recognition (OCR) on the picture and to create an indicator code corresponding to the identifier of the object, wherein the processor is further configured to create a processed result containing the indicator code and the location to locate the object within the site.

20 Claims, 13 Drawing Sheets

Related U.S. Application Data

12/262,130, filed on Oct. 30, 2008, now Pat. No. 8,146,813.

(60) Provisional application No. 60/983,888, filed on Oct. 30, 2007.

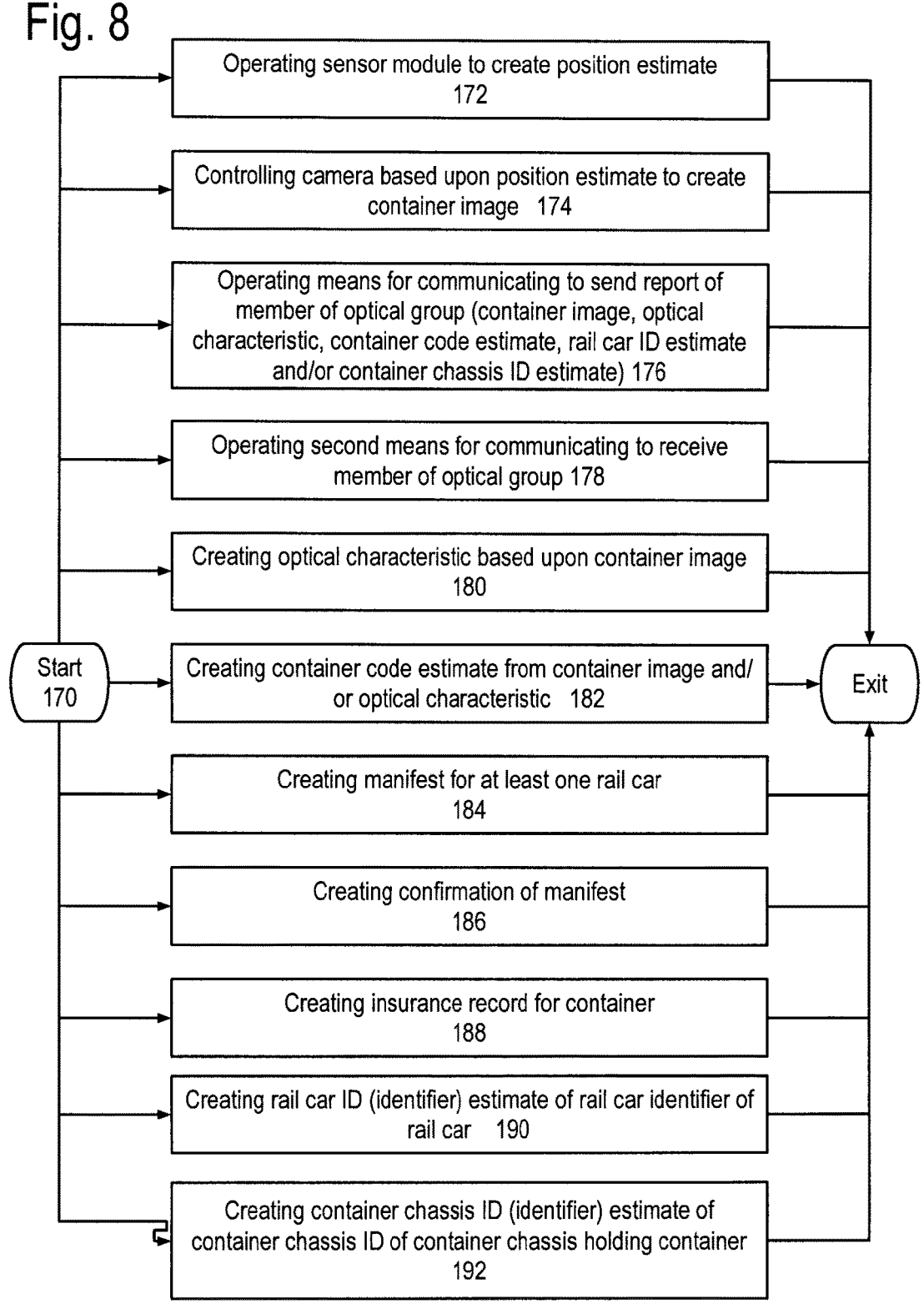

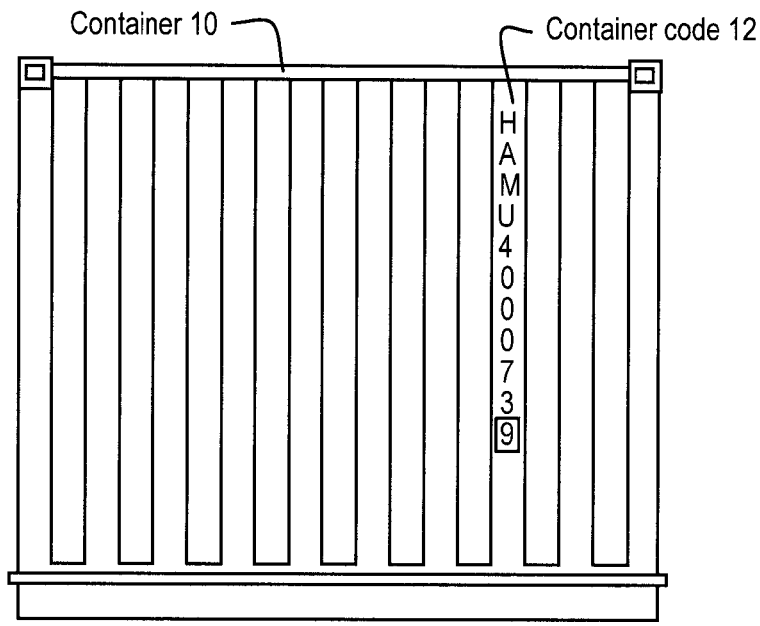
Fig. 9A
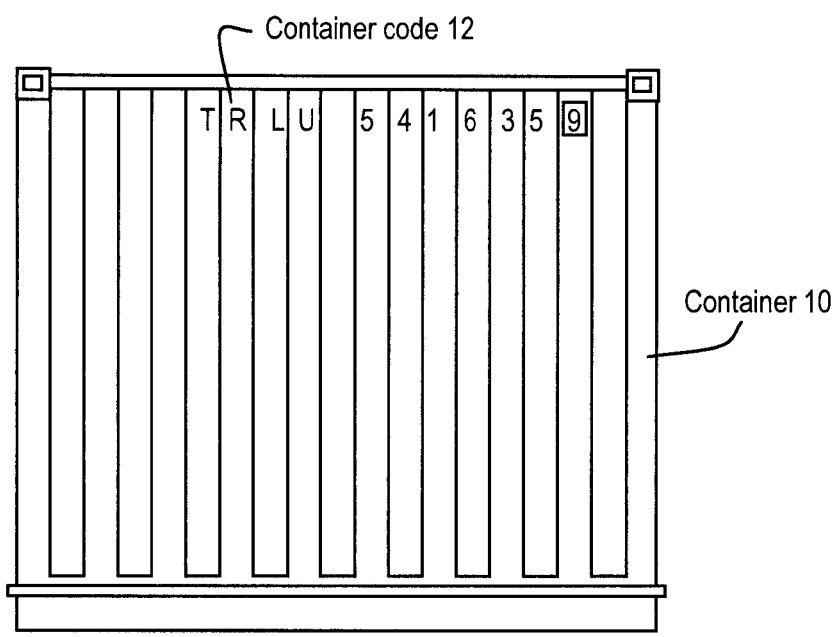
Fig. 9B
Fig. 9C

Fig. 15a
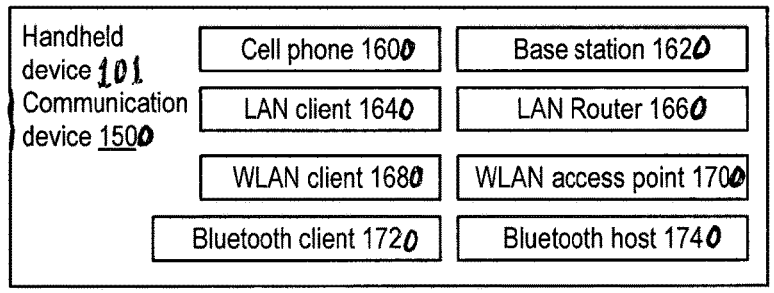
Fig. 15b
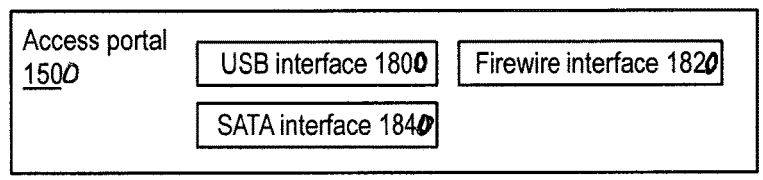
Fig. 16a
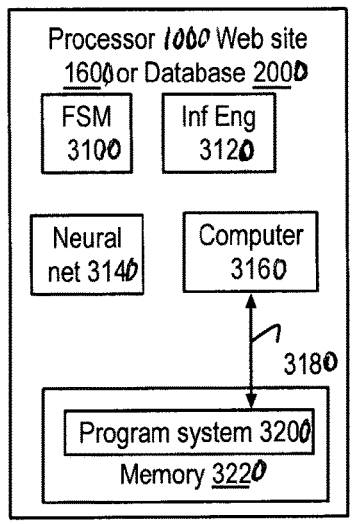
Fig. 16b
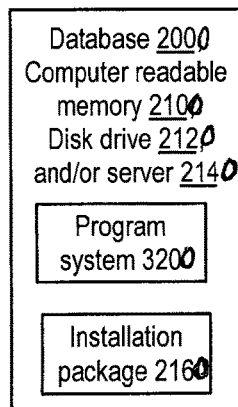
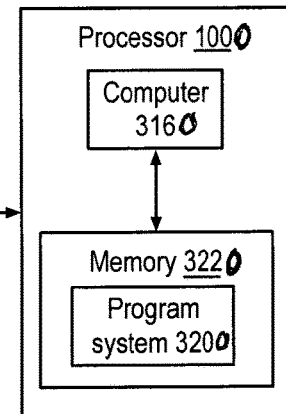

195

Yard Map for TEST100308 / Row11

Map Location of Chassis Imaged at Site
196

Row Represents Chassis
197

OCR result for Chassis as Processed by Server
198

MIV OCR Data for TEST100308 / Row11 / Trial01 on Mar 08, 2010

Fig. 20

PROCESSING CONTAINER IMAGES AND IDENTIFIERS USING OPTICAL CHARACTER RECOGNITION AND GEOLOCATION

CROSS REFERENCE TO RELATED APPLICATIONS

This application is a continuation-in-part of U.S. patent application Ser. No. 13/422,442 entitled "Method and Apparatus Processing Container Images and/or Identifying Codes For Front End Loaders or Container Handlers Servicing Rail Cars," filed Mar. 16, 2012, which is a Continuation of U.S. patent application Ser. No. 12/262,130 (Now U.S. Pat. No. 8,146,813), filed on Oct. 30 2008, which in turn claims the benefit of Provisional Patent Application No. 60/983,888 filed Oct. 30, 2007, which are all incorporated herein by reference.

TECHNICAL FIELD

Embodiments relate generally to container management systems for shipping and storage yards, and more specifically to imaging systems that process container identifiers using optical character recognition and geo-location technology.

BACKGROUND

Container terminals that service ships and trains, and store containers for end-user delivery rely on containers being transported in and out of the port via truck traffic. These containers are usually placed on a container chassis to transport the containers to a give destination that usually requires travel roads, or rail if the container and chassis are placed on a rail car for transport inland. When the container arrives at the destination, the container may be delivered without the chassis or moved to a different chassis for various other reasons, such as maintenance to a specific chassis.

Container chassis may have many different owners. Some are privately owned, others may be owned in a "pool" by several terminals in a specific area, and some may be owned by a specific company, such as a transportation company. It is very important for the person or company that is currently using the chassis to track the location of the chassis so the owner can maintain state and government registrations of the chassis and also allocate the chassis to the appropriate container load depending on its location. Since container chassis often travel hundreds or even thousands of miles to a specific destination, tracking chassis can be a very challenging task.

Chassis are typically tracked with an alphanumeric number that is unique to each particular chassis. A typical identifier format is "ABCD 123456" (where ABCD is any unique combination of letters and 123456 is any unique combination of numbers. The identifier may be placed or written on the sides, front, and back of the chassis. Terminals have a means of tracking a chassis as it arrives in the terminal gate, such as by using an Automated Gate System (AGS) to capture digital camera images of the chassis number on the front, sides, and back of the chassis as it travels through the gate. Once the chassis is inside a container terminal or storage area, the chassis is either allocated to a new container or is stored. Finding the chassis can often be very difficult as they are often stored in various arrangements (e.g., horizontal or vertical stacking) to minimize space.

One drawback associated with present chassis storage methods is that there is still a requirement to track and maintain a list of all chassis stored at a site so they can be matched to the right container when the chassis leaves the terminal facility. This is also important for valuation of chassis assets at a specific site and availability for new shipments. Current methods to track the chassis inventory require employees of the terminal site to manually climb in and around these vertically and horizontally stored chassis to record the chassis numbers and the location of the chassis within the terminal. As chassis inventory at a given site can vary greatly depending on the volume of containers and the number of chassis being moved at a given time, this method of recording chassis can be very labor-intensive and time-consuming. Maintaining the chassis inventory list can require teams of people to work full time writing or entering in chassis numbers into an inventory database. Furthermore, such work can be dangerous, as it may often occur in dark areas with extreme wet or cold conditions that can create hazardous and slippery conditions to personnel as they move around the chassis and storage site to record chassis identifier information.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

SUMMARY OF EMBODIMENTS

Embodiments are directed to systems and methods for managing inventory of objects, such as containers in a container yard or other large objects that are associated with unique identifiers for location within a site. In an embodiment, an apparatus comprises an imaging device configured to take a picture of an object, the picture containing an alphanumeric identifier of the object, a location identifying barcode or a global positioning system (GPS) component associated with the imaging device and configured to tag the image of the object with GPS location information of the object to generate a tagged image, a communications interface configured to transmit the tagged image to a server computer remote from the imaging device over an Internet Protocol (IP) network, and a processor of the server configured to perform Optical Character Recognition (OCR) on the picture and to create an indicator code corresponding to the identifier of the object, wherein the processor is further configured to create a processed result containing the indicator code and the location to locate the object within a site. The object may comprise a container of at least twenty feet long and a chassis configured to carry at least one container, and wherein the tagged image comprises metadata including the identifier and information of the container or of handling equipment of the container. The imaging device may comprise a handheld smartphone having a camera and a telecommunications interface. In an embodiment, the GPS component comprises a circuit resident in the smartphone. The imaging device may be a camera mounted on a mobile vehicle configured to drive around the site.

The processor may be configured to receive said tagged image through a web site. In an embodiment, the tagged image is displayed and processed in a web page displaying location information of the object in the site. The web page comprises a plurality of display areas showing the location of the object relative to a map of the site and a description of the location relative to defined coordinates of the site. The apparatus may further include an audit process providing display area configured to allow a user to correct an identifier processed by the OCR in the event of an error character recognition.

The site may be a container storage and transport terminal, and wherein the imaging device is mounted on at least one of: a top-handler, a rubber tire gantry crane. The imaging device may alternatively be mounted at a gate location of the site for imaging container transport vehicles as they enter or exit the site.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 8 shows a flowchart of the program system of FIG. 5, under some embodiments.

FIGS. 9A and 9B show some container images of the container code as displayed on various faces of the container, under some embodiments.

FIG. 9C shows a container code estimate derived from the container images, under some embodiments.

FIG. 15a shows some example components the handheld device of FIG. 1 may use and/or include to at least partly create the location, under some embodiments.

FIG. 15b shows some examples of an access portal that may be used by the communication device to send the tagged image.

FIG. 16a shows some examples of the components of the processor, the web site and/or the database, under an embodiment.

FIG. 16b shows some examples of the components of the processor, the web site and/or the database, under an alternative embodiment.

FIG. 20 illustrates a sample web page displaying container location information, under some embodiments.

DETAILED DESCRIPTION

Figure 1:
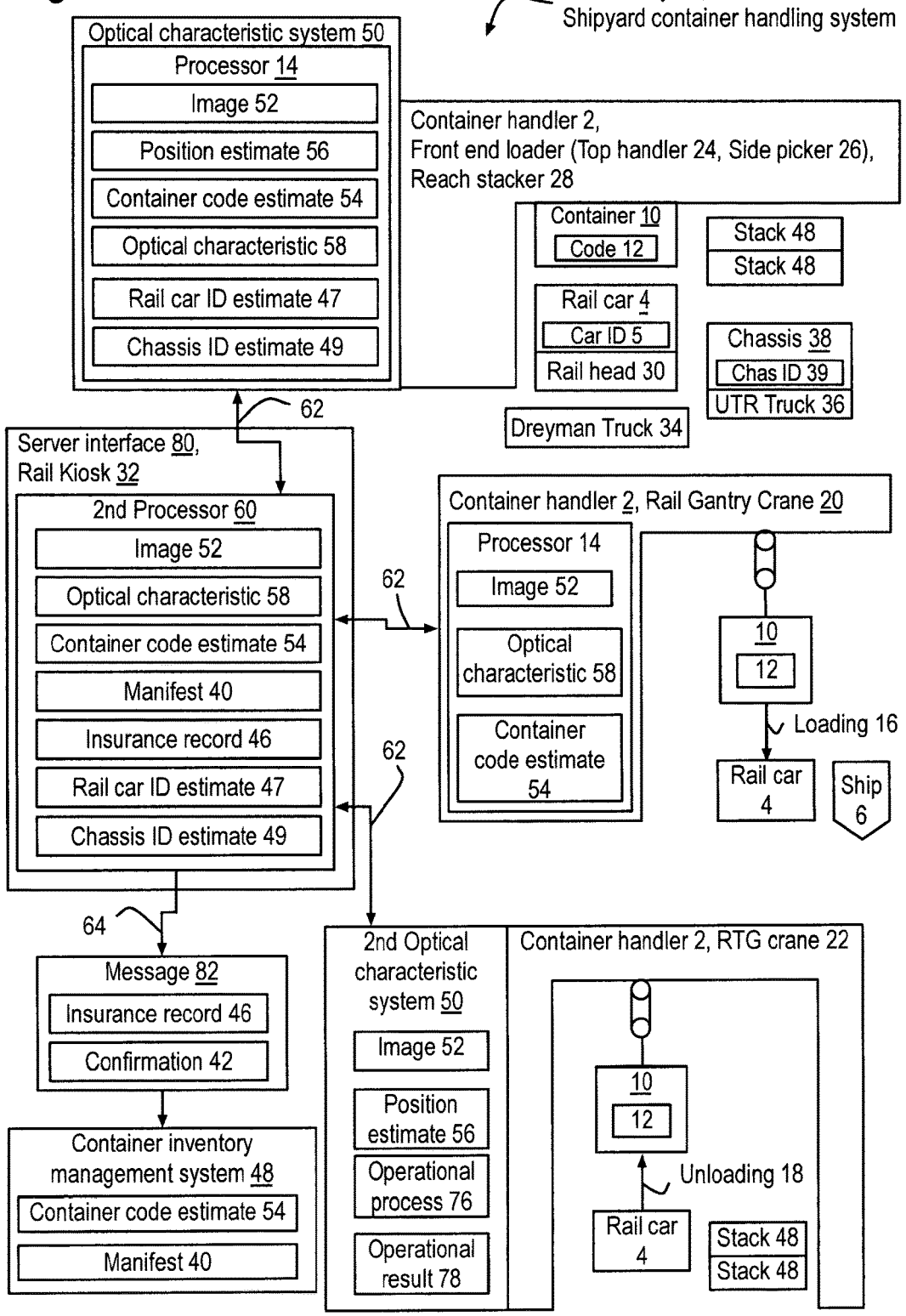
FIG. 1 shows an example of a container yard and/or a shipyard container handling system including a container imaging and processing system under embodiments.

Embodiments relate to operating at least one camera to create an image of a container by an apparatus on a container handler or included in a container handler, or other apparatus communicating with the container handler apparatus, and/or estimating the container's code while the container handler is servicing a transport element. The transport element may be a rail car, truck, ship, or other appropriate vehicle that moves or transports a container.

A first embodiment includes an optical characteristic system configured to couple to a container handler configured to transfer a container to/from a transport element to create at least one member of the optical group. The optical group consists of a container image of at least part of at least one face of the container, an optical characteristic derived from the container image, a container code estimate of a container code on the face, a transport element identifier estimate of a transport element identifier on the transport element and a container chassis identifier estimate for a container chassis that may hold the container during at least part of the transfer.

A second embodiment includes a server interface configured to receive the at least one member of the optical group from at least one of the container handler to create another of the members of the optical group and/or a manifest for at least the transport element and/or a confirmation of the manifest and/or an insurance record for the container. The container handler may be a front end loader, a reach stacker, or a gantry crane. The front end loader may be a top handler or a side picker. The gantry crane may be a quay crane and/or a rail gantry crane. Alternatively, the gantry crane may be a rubber tire gantry crane.

A third embodiment includes an optical characteristic system configured to couple to a container handler configured to transfer a container to create at least one member of the optical group, where the container handler is a front end loader.

A fourth embodiment includes a container handler configured to transfer at least one container to/from a transport element and configured to report at least one member of the optical group.

A fifth embodiment includes a server computer configured to receive at least one member of the optical group from at least one container handler to create another of the members of the optical group and/or a manifest for at least the transport element and/or a confirmation of the manifest and/or an insurance record for the container. The server computer (also referred to as a "server") may be embodied as processor-based computer server that is kept in a computer server room within or remote from a transport or shipping facility (such as in a rail kiosk or other remote location), or it may be any appropriately configured server computer located and operated in the vicinity of, or remotely from the transport or shipping facility in which the containers are handled.

A sixth embodiment operates a server configured to receive at least one member of the optical group from at least one container handler configured to transfer a container and/or operates the server interface to receive from the container handler and/or the optical characteristic system for the container transferred to/from the transport element and/or operates the container inventory management system to receive from the server and/or the server interface. The optical characteristic derived from the container image may include an optical enhancement of the container image. It may also be preferred that the optical characteristic further includes a compression of the container image and/or the optical enhancement.

The insurance record may be created using at least one of the container images for each of at least two members of the face group of the container. The face group consists of a top face, a bottom face, a front face, a back face, a left face and a right face, each of the container.

In certain embodiments, the container handler and/or the optical characteristic system may include a processor communicatively coupled to at least one camera configured to create the container image of the container, possibly for transfer to/from the transport element. The processor may also be communicatively coupled to a means for communicating to send at least one member of the optical group.

In certain embodiments, the server interface and/or the server may include a second processor communicatively coupled to a second means for communicating to receive the member of the optical group from a container handler and/or from an optical characteristic system coupled to the container handler, possibly with the container handler transferring the container to/from a transport element. The second processor may create at least one items discussed above for the server interface and/or the server.

The container handler and/or the optical characteristic system may be configured to wirelessly report at least one of the optical group members. The server interface and/or the server may be configured to wirelessly receive the report.

The container handler and/or the optical characteristic system may further include a sensor module to create a position estimate that may be used to direct the camera to create the container image.

FIG. 1 shows an example of a container yard and/or a shipyard container handling system including one or more embodiments of the in operation storing and/or transferring containers 10 with a container code 12 and possibly using at least one transport element 4. Various embodiments of the invention may involve a container handler 2 transferring containers to and/or from a transport element 4 and reporting a container code estimate 54 and/or an optical characteristic 58 and/or a container image 52 of the container handled by the container handler as well as a transport element identifier estimate 47 of a transport element identifier 5 on the transport element and a container chassis identifier estimate 49 for a container chassis 38 that may hold the container during at least part of the transfer. As used herein the relationship "to and/or from" will be referred to as "to/from".

A first embodiment includes an optical characteristic system 50 configured to couple to a container handler 2 configured to transfer a container 10 to/from a transport element 4 to create at least one member of an optical group. The optical group consists of a container image 52 of at least part of at least one face of the container, an optical characteristic 58 derived from the container image and an container code estimate 54 of a container code 12 on the face of the container as well as the transport element identifier estimate 47 of the transport element identifier 5 on the transport element and the container chassis identifier estimate 49 of the Chassis identifier 39 as marked on the container chassis 38 that may hold the container during at least part of the transfer.

A second embodiment includes a server interface 80 configured to receive the at least one member of the optical group from at least one container handler 2 to create another of the members of the optical group and/or a manifest 40 for at least the transport element 4 and/or a confirmation 42 of the manifest and/or an insurance record 46 for the container 10.

The container handler 2 may be a front end loader, a reach stacker 28, or a gantry crane. The front end loader may be a top handler 24 or a side picker 26. The gantry crane may be a quay crane 20 and/or a rail gantry crane 20. Alternatively, the gantry crane may be a rubber tire gantry crane 22.

The third embodiment may also include an optical characteristic system 50 configured to couple to a container handler 2 configured to transfer a container 10 to create at least one member of the optical group, where the container handler is a front end loader, for example, a top handler 24 or a side picker 26. As used herein a top handler may move a container in a forklift fashion and side pickers, which may also be referred to as side handlers, may operate similarly to top handlers but are frequently used for lifting at least partly empty containers from the side to speed the movement of such containers.

A fourth embodiment includes the container handler 2 configured to transfer at least one container 10 to/from a transport element 4 and configured to report at least one member of the optical group, for example, the container image 52, the optical characteristic 58 and/or the container code estimate 54 as well as the transport element identifier estimate 47 of the transport element identifier 5 on the transport element and the container chassis identifier estimate 49 for the identification of chassis identifier 39 as marked on container chassis 38 that may hold the container during at least part of the transfer.

A fifth embodiment includes a server 32 configured to receive at least one member of the optical group from at least one container handler 2 to create another of the members of the optical group and/or a manifest 40 for at least the transport element 4 and/or a confirmation 42 of the manifest and/or an insurance record 46 for the container 10.

The sixth embodiment includes a container inventory management system 48 configured to receive from the server interface 80 and/or the server 32 at least one of the following: the container code estimate 54, the manifest 40, the confirmation 42 and/or the insurance record 46 as well as the transport element identifier estimate 47 of the transport element identifier 5 on the transport element and the container chassis identifier estimate 49 for the identification of chassis identifier 39 as marked on container chassis 38 that may hold the container during at least part of the transfer.

The seventh embodiment operates a server 32 configured to receive at least one member of the optical group from at least one container handler 2 configured to transfer a container 10 and/or operate the server interface 80 to receive from the container handler 2 and/or the optical characteristic system 50 for the container transferred to/from the transport element 4 and/or operate the container inventory management system 48 to receive from the server and/or the server interface.

In various embodiments, a container handler 2 and/or an optical characteristic system 50 may be communicatively coupled 62 with the server interface 80 and/or the server 32.

It may be preferred that the container 10 be at least twenty feet long, though other lengths 181 and sizes are also possible. By way of example, the size of the container may be ten feet, twenty feet, twenty four feet, thirty three feet, forty five feet or fifty three feet.

The optical characteristic 58 derived from the container image 52 may include an optical enhancement of the container image. The optical enhancement may include the removal of glare, color correction, edge enhancement, contrast adjustment and any image filter as found in a software tool for image processing of digital photos and/or digital videos. It may also be preferred that the optical characteristic further includes a compression of the container image and/or the optical enhancement. The compression may comply with an international standard, such as a version of JPEG or MPEG.

The container handler 2 and/or the optical characteristic system 50 may include a processor 14 communicatively coupled to at least one camera 6 configured to create the container image 52 of the container 10, possibly for transfer to/from the transport element. The processor may also be communicatively coupled to a means for communicating 106 to send at least one member of the optical group.

The processor 14 may receive the container image 52 as a raw version to create a filtered version, a compressed version, and/or an enhanced version of the image as the optical characteristic 58. The filtered version may remove or attenuate certain frequency bands of the raw version. The compressed version may require smaller storage capacity than the raw version; and the enhanced version may enhance contrast and/or strengthen edges detected in the raw version.

The server interface 80 and/or the server 32 may include a second processor 60 to receive via the communicative coupling 62 the member of the optical group from the container handler 2 and/or from the optical characteristic system 50 coupled to the container handler. The container handler may be transferring the container to/from a transport element 4. The second processor may create at least one items discussed above for the server interface and/or the server.

As shown in FIG. 1, some embodiments of the invention may operate a container handler 2 loading 60 or unloading 16 the transport element 4 and reporting the container estimate 54 and/or optical characteristic 58 and/or a container image 52 of a container 10 handled by the container handler.

A transport element 4 may be stopped in a container terminal servicing at least one dock configured to load 60 and/or unload 62 a ship 64 and/or in a rail yard for transferring containers between at least one rail line and at least one trucking route configured for draymen trucks 34 and/or at least one warehouse (not shown) and/or at least one factory (not shown). Sometimes a container may be transferred to a transport element from a ship 64, to a transport element from a stack 48, to a transport element from a drayman (or "dreyman"), or to a transport element from a UTR truck 36 and/or a container chassis 38. Alternatively, the container may be transferred from a transport element to a stack, from a transport element to a vessel, or from a transport element to a drayman. A rail head 30 will refer to a site where a transport element may be stopped and a container may be transferred onto or off of the transport element or rail car.

Some embodiments may manage a container inventory system 48 based upon receiving 64 the container code estimate 54 and/or the optical characteristic 58 and/or container image 52 for a container 10 being transferred by a transport element 4 in contact with a container yard, which may be a shipyard.

Some embodiment methods may include optically recognizing container codes 12 of containers 10 in transfer operations involving draymen trucks 34 and stacks 48 of containers in particular by front end loaders. As used herein, a drayman vehicle is a land transport vehicle frequently comprising a truck and at least one trailer, which can transport containers within a container terminal and over public roads and highways.

Various embodiments of the invention may operate in a container storage and/or transfer yard, which may service container ships, railroads, overland trucks, factories and/or warehouses supporting the automated recognizing of container codes 12 displayed on various sides of the containers 10 being stored and/or transferred. At least one processor 14, 124 and/or 60 may initiate an operational process 76 by an optical characteristic system 50 mounted on a container handler 2 to create an operational result 78, select the operational process based upon an operational schedule 130 and/or communicate 62 with at least one of the optical characteristic systems to receive at least one container image 52 of a container 10 being handled by the container handler to at least partly create a container code estimate 54 for transmission to a container inventory management system 48.

Figure 2:
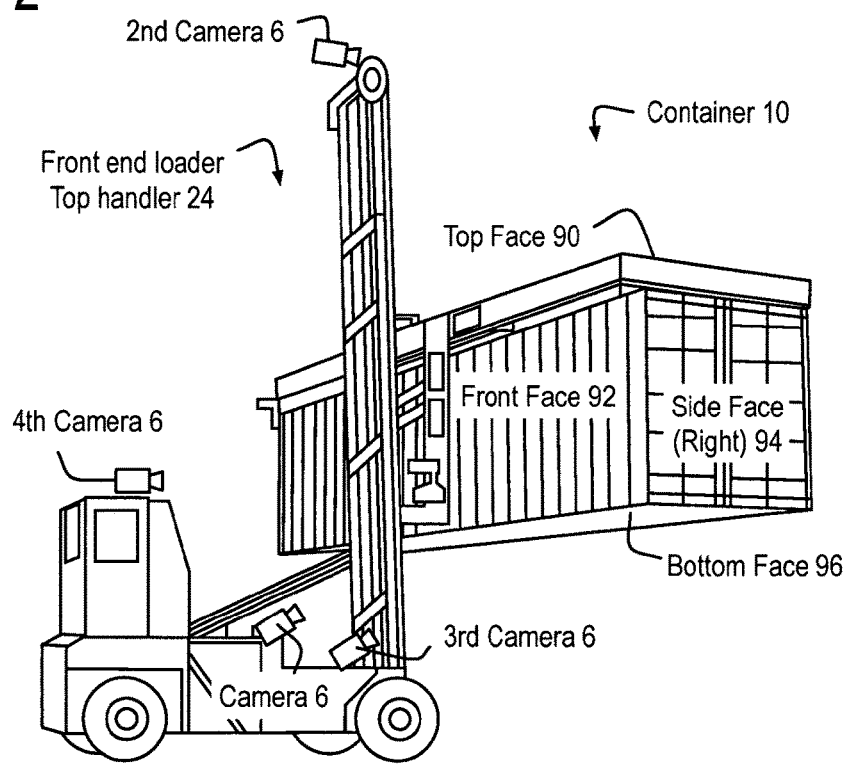
FIG. 2 shows an example of a front end loader, in particular a top handler, coupled to multiple cameras configured to create images of various faces of the container.

FIG. 2 shows an example of a front end loader (FEL), in particular a top handler 24, coupled to multiple cameras configured to create images of various faces of the container 10.

If an insurance record 46 is processed, it may be created using at least one of the container images 52 for each of at least two members of the face group of the container. The face group consists of a top face 90, a bottom face 96, a front face 92, a back face, a side face 94, which may be a left face and a right face, each of the container 10, as shown in FIG. 2.

Figure 3:
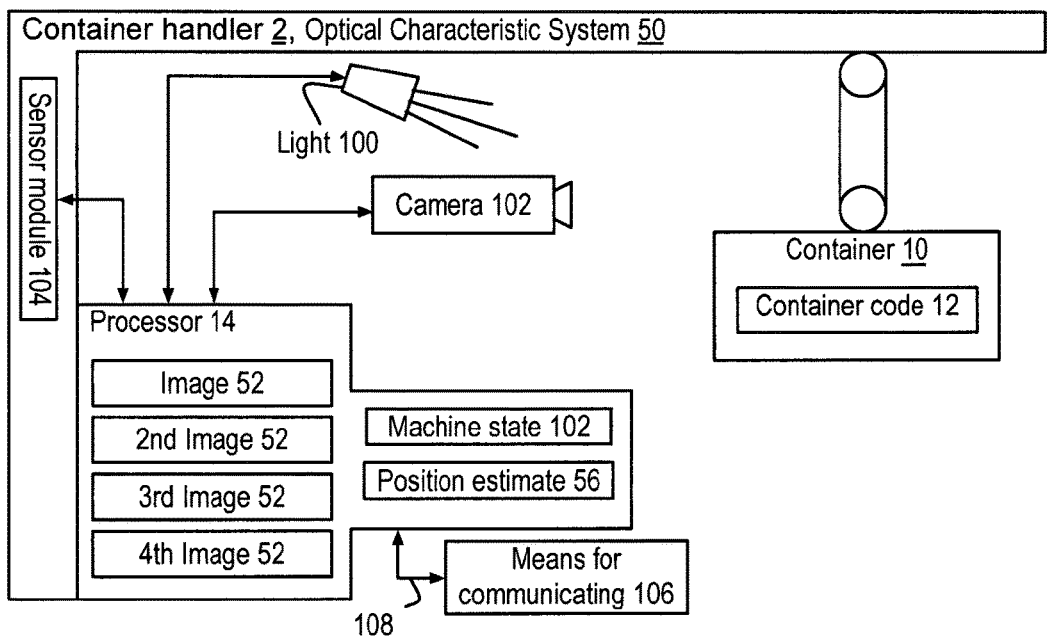
FIG. 3 shows some details of the optical characteristic system and/or the container handler, including at least one light and at least one camera.

FIG. 3 shows some details of the optical characteristic system 50 and/or the container handler 2 of FIG. 1, including at least one light 100 and at least one camera 102, both may preferably be coupled to the processor 14 to receive at least one container image 52. The processor may be coupled with a sensor module 104 to create a machine state 102 used to determine the position estimate 56 and communicatively coupled 108 with a means for communicating 106 to report the container image 52 and/or the optical characteristic 58 (as shown in FIG. 1) and/or the container code estimate 54. The position estimate may be used to direct the camera and/or the lights to improve the quality of the container image.

Returning to FIG. 2, the optical characteristic system 50 and/or the container handler 2 may include at least one camera 102 based upon the position estimate 56 of a container 10 to create the container image 52. The container image may be used to create a container code estimate of the container code 12 on a face of the container and/or be used as a front side image of the front face 92 of the container or to image longer containers (e.g., 40 ft and greater). A second camera may be mounted near the top of the front end loader to create a second container image of the top face 90 of the container. A third camera may be mounted to focus a container image where a twenty foot container's container code 12 is found. A third camera may be mounted near the bottom of the front end loader to create a third container image of the bottom face 96 of the container. And a fourth camera may be positioned near the cab of the front end loader for capturing the container as it is moved for auditing purposes. A fifth camera maybe added to capture a drayman truck chassis ID 49 and/or transport element chassis identifier 5.

Figure 4:
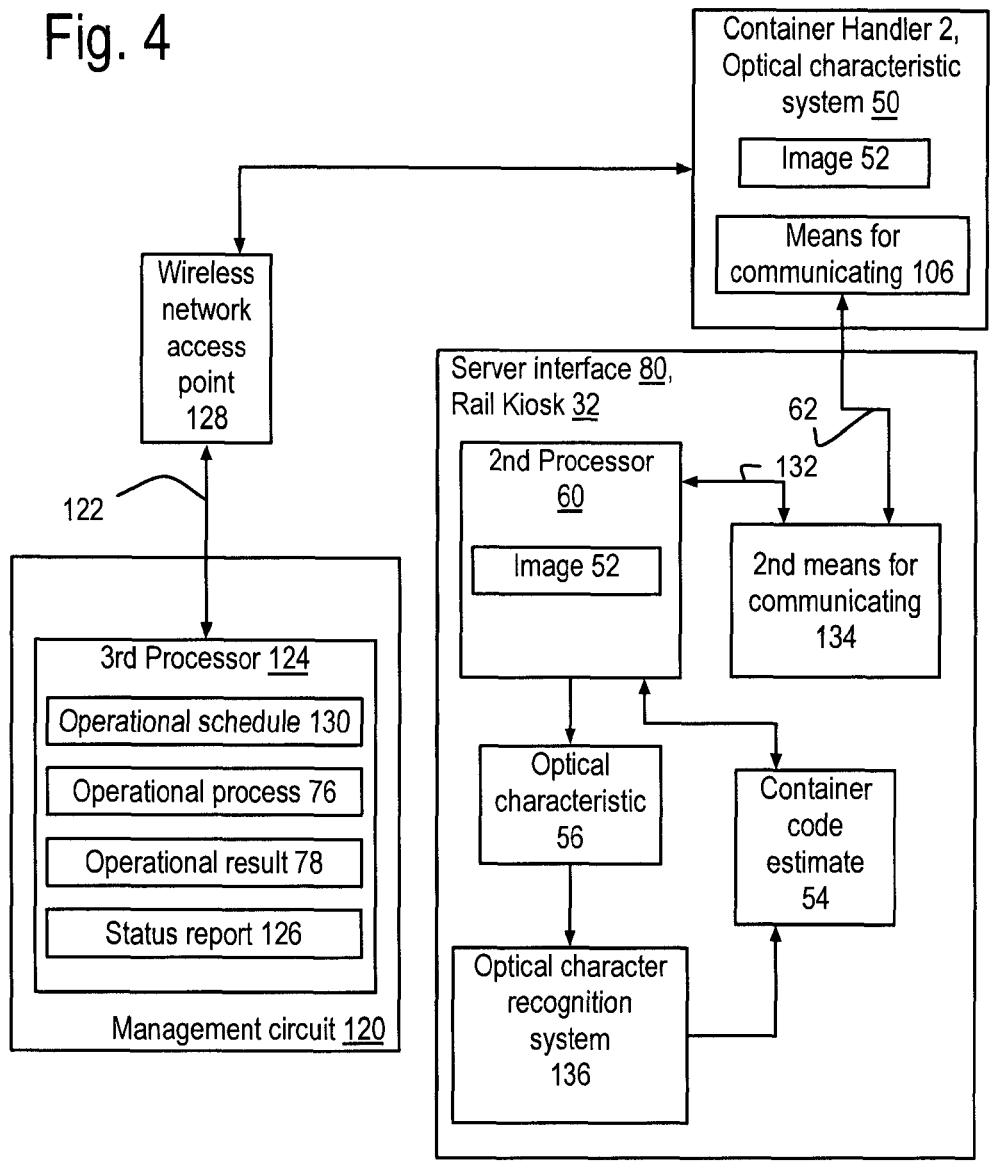
FIG. 4 shows a refinement of some aspects of FIG. 1, where the server interface further includes the second processor communicatively coupled to a second means for communicating to receive the member of the optical group from a container handler and/or from an optical characteristic system coupled to the container handler.

FIG. 4 shows a refinement of some aspects of FIG. 1, where the server interface 80 and/or the server 32 further include the second processor 60 may be communicatively coupled 132 to a second means for communicating 134 to receive via the communicative coupling 62 the member of the optical group from a container handler 2 and/or from an optical characteristic system 50 coupled to the container handler, possibly with the container handler transferring the container 10 to/from a transport element 4. The second processor may create at least one items discussed above received by the server interface and/or the server. The second processor may use an optical character recognition system 136 to create the container code estimate 54 from the optical characteristic 56 and/or from the container image 52 received from the container handler and/or the optical characteristic system.

The means for communicating 106 and/or the second means for communicating 134 may use a network protocol that complies with at least one member of the group consisting of: a wireless network protocol standard and a wireline network protocol, a time divisional multiple access protocol, a spread spectrum protocol, a packet transfer protocol, a frame transfer protocol, an error correction coding protocol and an encryption protocol. If a wireline network protocol is used, it may include at least one of the following: a Synchronous Serial Interface protocol, an Ethernet protocol, a Serial Peripheral Interface protocol, an RS-232 protocol, and Inter-IC protocol (sometimes abbreviated as I2C), a Universal Serial Bus (USB) protocol, a Controller Area Network (CAN) protocol, a firewire protocol, which may include implementations of a version of the IEEE 1394 protocol, an RS-485 protocol and/or an RS-422 protocol.

The container handler 2 and/or the optical characteristic system 50 may be configured to wirelessly report 62 at least one of the optical group members. The server interface 80 and/or the server 32 may be configured to wirelessly receive the report.

The means for communicating 76 and/or the second means for communicating 134 and/or the wireless network access point 128 may include a radio frequency tag terminal and/or a radio frequency transmitter and receiver compliant with at least one wireless signaling convention that may implement at least one of a Time Division Multiple Access (TDMA) scheme, a Frequency Division Multiple Access (FDMA) scheme, and/or a spread spectrum scheme.

Figure 5:
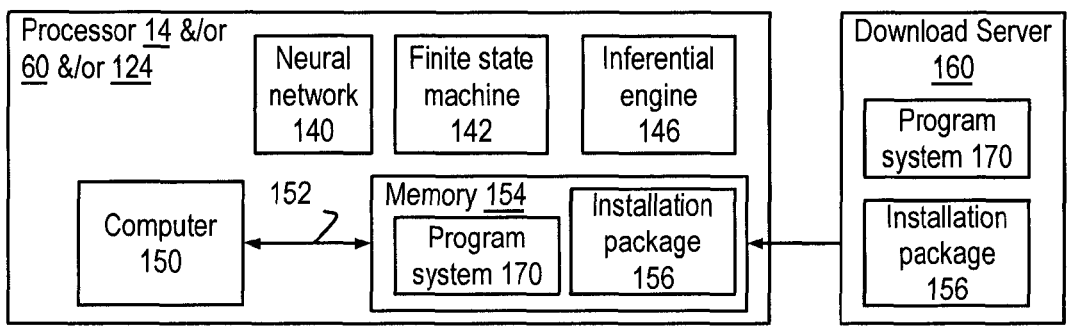
FIG. 5 illustrates a composition of any of the processors, under some embodiments.

As shown in FIG. 5, at least one of the processors 14 and/or 60 and/or 124 may include at least one instance of at least one of a neural network 140, a finite state machine 142, an inferential engine 146, and a computer 150 accessibly coupled 152 to a computer readable memory 154 including a program system 170 and/or an installation package 156 configured to affect the program system. In some embodiments, the installation package may create the program system and/or modify an existing program system to implement various combinations of program steps embodying instructions that implement one or more embodiments. The program system and/or the installation package may be provided through access with a download server 160, which may be provided across an open network such as the Internet and/or through a private network as such a virtual private network or through the use of an access protocol possibly using a user name and a password.

As used herein, a finite state machine 132 receives at least one input, maintains and updates at least one state and generates at least one output based upon the value of at least one of the inputs and/or the value of at least one of the states.

As used herein, an inferential engine 134 maintains a collection of inference rules and a fact database and responds to queries and assertions by invoking rules and accessing the fact database. Examples of inferential engines include fuzzy logic controllers and constraint based decision engines used to determine paths through networks based upon the network constraints, such as the current location of parked and moving vehicles and available storage locations for containers.

As used herein, a computer 150 includes at least one data processor and at least one instruction processor instructed by the program system 170, where each of the data processors is instructed by at least one of the instruction processors.

Figure 6:
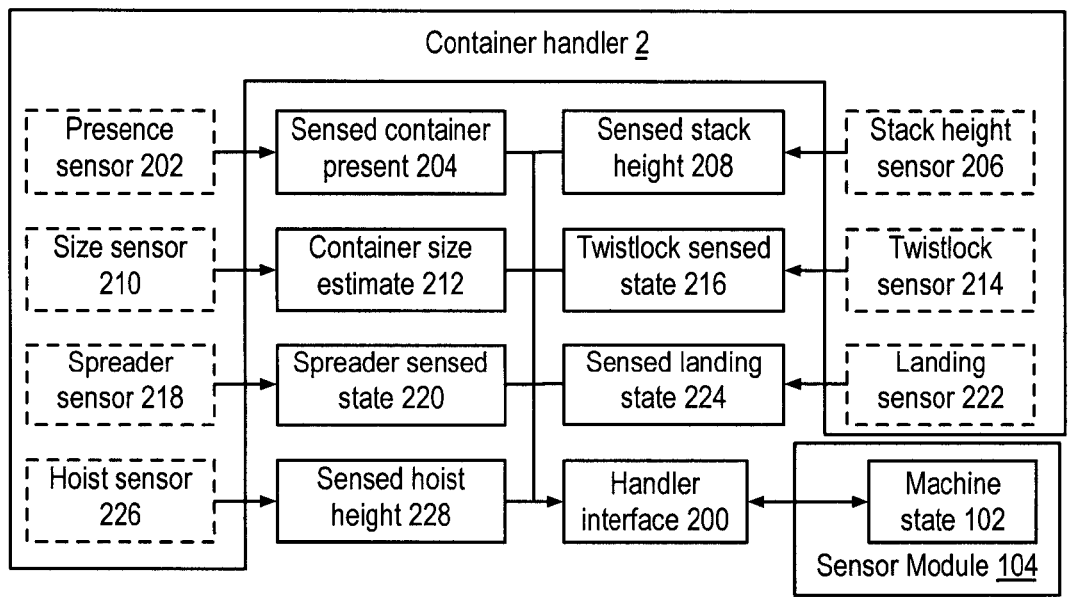
FIG. 6 shows some details of the sensor module and the machine state of FIG. 3, under some embodiments.

As shown in FIGS. 3 and 6, the container handler 2 and/or the optical characteristic system 50 may further include a sensor module 104 to create a position estimate 56 that may be used to direct the camera 102 to create the container image 52. The camera may preferably be directed in coordination with the light 100.

FIG. 6 shows some further details of the sensor module 104 and the machine state 102 of the container handler 2 of FIG. 3. A presence sensor 202 may respond to the presence of a container 10 to create a sensed container present 204. A stack height sensor 206 may create a Sensed stack height 208. A Size sensor 210 may respond to the container being handled to create a Container size estimate 212. A Twistlock sensor 214 may create a Twistlock sensed state 216. A Spreader sensor 218 may create a Spreader sensed state 220. A Landing sensor 222 may create a Sensed landing state 224. And/or a Hoist sensor 226 may create a sensed hoist height 228. Any or all of the sensed states 62, 66, 70, 74, 78, 82, 86 and/or 90 may be included in the machine state. The sensor module may further communicate with a handler interface 200 to create the machine state.

The handler interface 200 may vary for different container handlers 2. For example when the container handler is a gantry crane such as rail gantry crane 20 or an RTG crane 22, the container handler may include a means to sense the crane spreader interface signals (landed, locked, container width), and may further, possibly separately couple to sensors on the crane hoist or trolley drum for determining the trolley and hoist position of the crane, for instance by using a tachometer, proximity sensor, optical sensor, encoder, or laser beam. Other embodiments of the handler interface may include a coupling to a Programmable Logic Controller (PLC) to capture this data. Also, the handler interface may include a wireline network interface to at least one of the sensors of the container handler. As used herein, a wireline network interface may implement an interface to at least one of the wireline network protocols mentioned herein. Embodiments are configured to operate with an RTG (rubber tire gantry crane), and RMG (rail mounted gantry crane), or similar crane or hoisting equipment.

Another example, when the container handler 2 is a side picker 26, a top handler 24 or a reach stacker 28, the handler interface 200 may include a wireline network interface to at least one of the sensors of the container handler. Other sensors may be accessible to the handler interface through separate wireline network interfaces and/or wireline network couplings.

A third example, when the container handler 2 is a UTR truck 36 or a container chassis 38, the handler interface 200 may include a wireline network interface to at least one, and possibly all the accessed sensors of the container handler. Alternatively, more than one wireline network interfaces and/or wireline network couplings may be used.

The handler interface 200 may further receive any or all of the following information that may be forwarded to the container inventory management system 48: the location of the container 10, a sensed operator identity of the operator operating the container handler 2, a container radio frequency tag, a container weight, a container damage estimate, an indication of the container handler moving in a reverse motion, a frequent stops count, a fuel level estimate, a compass reading, a collision state, a wind speed estimate, a vehicle speed, and an estimate of the state of a vehicle braking system.

The handler interface 200 may include a radio transceiver providing a radio frequency tag interface capable of locating the container handler 2 and/or identifying the container 10 and/or its container code 12.

The handler interface 200 may include another radio transceiver using a Global Positioning System (GPS) and/or a Differential Global Position System (DGPS) to determine the location of the container 10. The handler interface 200 may include an interface to a short range and/or low power radar that may provide a position estimate 56 of the container 10.

Figure 7:
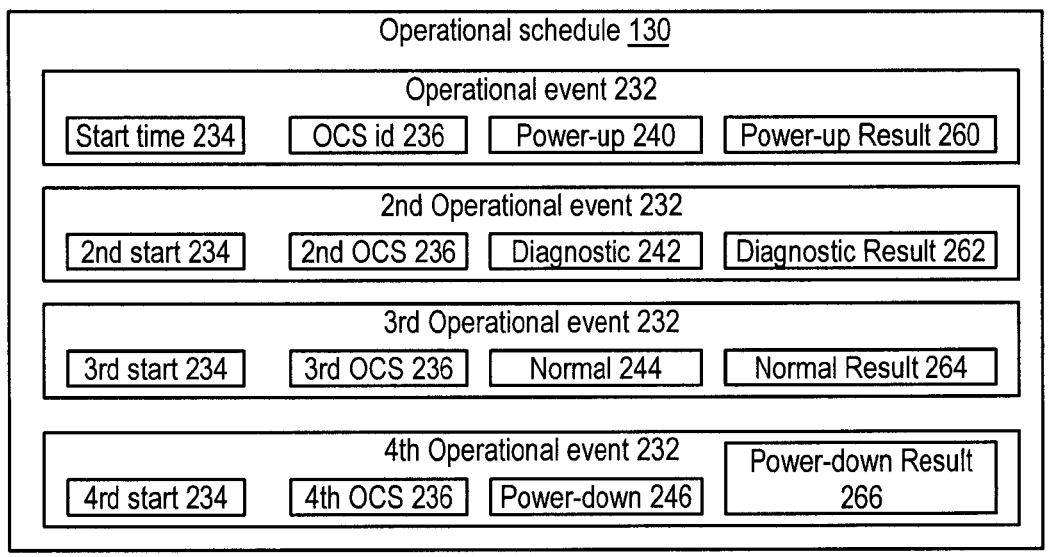
FIG. 7 shows an example of some of the details of the operational schedule of FIG. 1, under some embodiments.

FIG. 7 shows an example of some of the details of the operational schedule 130 of FIG. 1, including multiple operational events 232, each including a start time 234, a list of identified optical characteristic systems 236, an operational process, and its operational result. The operational process may be a member of the group consisting of a power-up process 240, a diagnostic process 242, a normal process 244 and a power-down process 246.

Some of the following figures show flowcharts of at least one embodiment of at least one of the methods of the invention, which may include arrows signifying a flow of control, and sometimes data, supporting various implementations.

The boxes denote steps or program steps of at least one of the invention's methods and may further denote at least one dominant response in a neural network 140, and/or at least one state transition of the finite state machine 146, and/or at least one inferential link in the inferential engine 142, and/or a program step, or operation, or program thread, executing upon the computer 150.

Each of these steps may at least partly support the operation to be performed as part of a means for an operation or use. Other circuitry such as network interfaces, radio transmitters, radio receivers, specialized encoders and/or decoders, sensors, memory management and so on may also be involved in performing the operation further providing the means for the operation.

The operation of starting in a flowchart is denoted by a rounded box with the word "Start" in it and may refer to at least one of the following: entering a subroutine or a macro instruction sequence in the computer 150, and/or of directing a state transition of the finite state machine 146, possibly pushing of a return state, and/or entering a deeper node of the inferential engine 142 and/or stimulating a list of neurons in the neural network 140.

The operation of termination in a flowchart is denoted by a rounded box with the word "Exit" in it and may refer to completion of those operations, which may result in at least one of the following: a return to dormancy of the firing of the neurons in the neural network 140, and/or traversal to a higher node in the graph of the fact database and/or the rules collection in the inferential engine 142, and/or possibly return to a previously pushed state in the finite state machine 146, and/or in a subroutine return in the computer 150.

FIG. 8 shows a flowchart of the program system 170 of FIG. 5 as including at least one of the following program steps: Program step 172 supports operating the sensor module 104 to create the position estimate 56 of the container 10 as shown in FIG. 3. Program step 174 supports controlling the camera 6 based upon the position estimate to create the container image 52. Program step 176 supports operating the means for communicating 106 to send the report of the member of the optical group, in particular the container image 52, the optical characteristic 104, the container code estimate 54 as well as the transport element identifier estimate 47 of the transport element identifier 5 on the transport element and the bomb cart or container chassis identifier estimate 49 for the container chassis 38 that may hold the container during at least part of the transfer. Program step 178 supports operating the second means for communicating 134 to receive the report of the member of the optical group as shown in FIG. 4. Program step 180 supports creating the optical characteristic based upon the container image. Program step 182 supports creating the container code estimate from the container image and/or the optical characteristic. Program step 184 supports creating the manifest 40 for the transport element 4, preferably based upon the container code estimate as generated by the server 32 in some embodiments of the invention. Program step 186 supports creating the confirmation 42 of the manifest 40 from the container code estimate derived from the container image sent by the container handler 2 and/or the optical characteristic system 50. Program step 188 supports creating the insurance record 46 for the container, preferably through archiving two or more container images of the faces of the container as shown in FIG. 2. Program step 190 supports creating the transport element identifier estimate 47 of the transport element identifier 5 of the transport element 4 as shown in FIG. 1. And program step 192 supports creating the container chassis identifier estimate 49 of the container chassis identifier 39 of the container chassis 38 holding the container 10 for at least part of the transfer.

FIGS. 9A and 9B show some example container images of the container code 12 as displayed on various faces of the container 10. And FIG. 9C shows a container code estimate 54 derived from one of these container images and/or an optical characteristic 56 as discussed previously. Transport element identifiers 5 and/or container chassis identifiers 39 may be implemented in a fashion similar to container codes and/or may be implemented using Radio Frequency Identification (RFID) technology.

Optical Character Recognition and Asset Location Determination with a Handheld Device Embodiments include a system that applies and processes Optical Character Recognition (OCR) of tagged images of a container and/or a container chassis to create an indicator code. The tagged images are generated by a handheld device and include at least one image of an indicator on the side of the object (container and/or chassis) and a location. A processed result of the indicator code and the location are then used by a management system to track the location of the object and possibly its status, such as the temperature in a refrigerated container.

Embodiments of the invention include methods and apparatus that aid in managing an object. The object 8 may include a container 20 at least twenty feet in length and/or a chassis 24 configured to carry at least one of the containers. A handheld device may be used to generate a tagged image of an indicator on the side of the object. The tagged image may include an image of the indicator and a location associated with the object. A processor receives the tagged image and responds by performing Optical Character Recognition (OCR) on the image to create an indicator code. The indicator code and the location may be used to update a database regarding the object.

Figure 10:
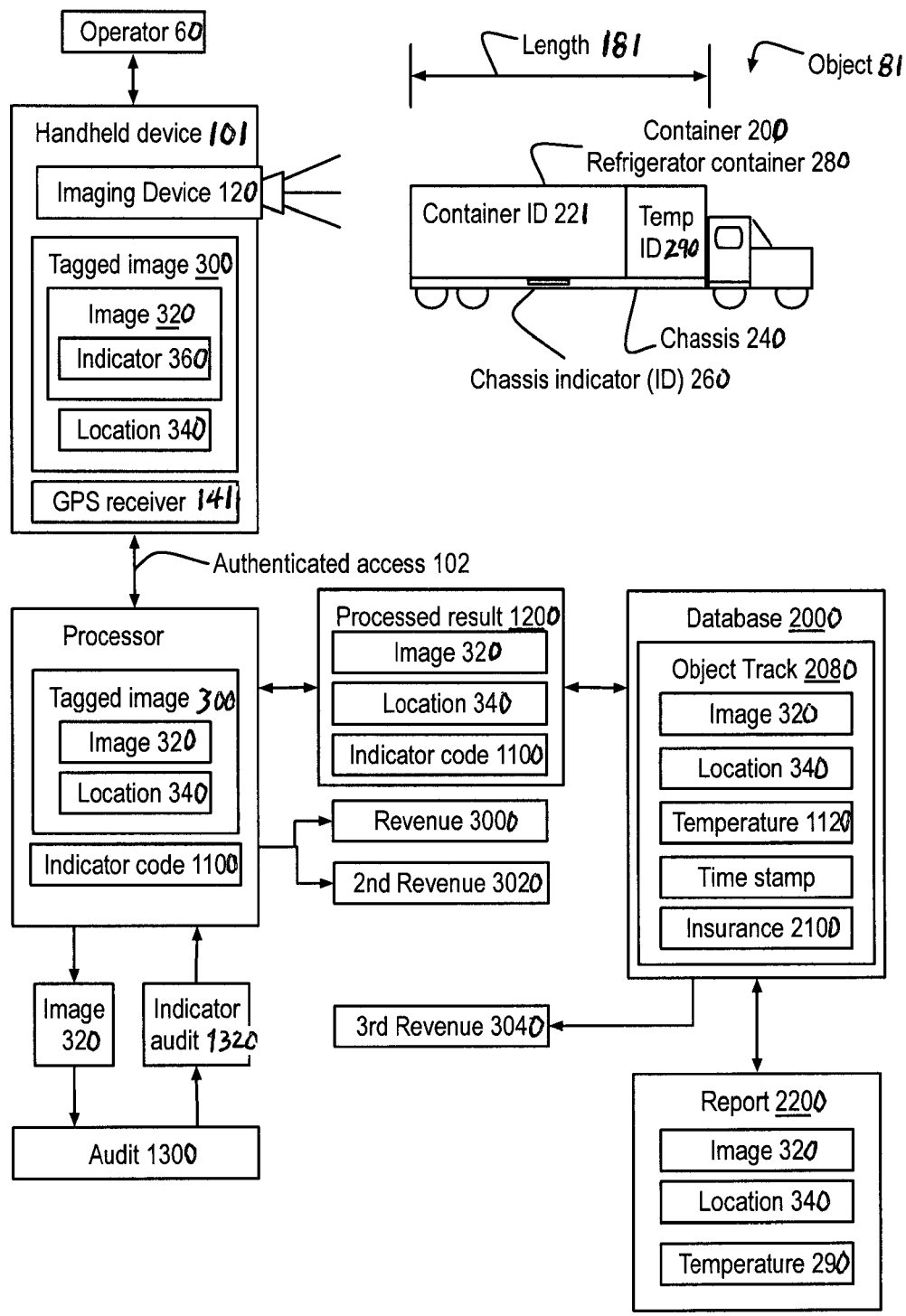
FIG. 10 shows an example of a handheld device generating a tagged image of an indicator on a surface of an object, under an embodiment.

Referring to the Figures, FIG. 10 shows a system that may include the following: The handheld device 101 generates a tagged image 300 of an indicator 360 on the side of the object 81, such as a chassis indicator 260 or a container indicator 221. The tagged image 300 may include an image 320 of the indicator 360 and a location 340 associated with the object. A processor 1000 receives 1020 the tagged image and responds by performing Optical Character Recognition (OCR) on the image to create an indicator code 1100. The indicator code and the location may be used as a processed result 1200 to update a database 2000 about the object 81, shown here as the object track 2080, that may include the image 320, its location 340, the temperature 1100 as a temperature indicator 290 of the temperature inside a refrigerated container 280. This database may be used to generate a report 2200 about the object 81 and its location 340, which may further include the internal temperature 290 for refrigeration containers 280, insurance 2100 related images and reports. The embodiments may determine that the OCR results are inaccurate and may trigger an audit 1300 of the image 320 to create an indicator audit estimate 1320.

A processed result 1200 may include the indicator code 1100 and the location 340 to help locate and identify the object 81. The processed result may also include the image 320, the temperature indication 1100, a time stamp, which may have been embedded in the tagged image 300 as well as possibly an operator identifier of the handheld device 101.

Figure 11:
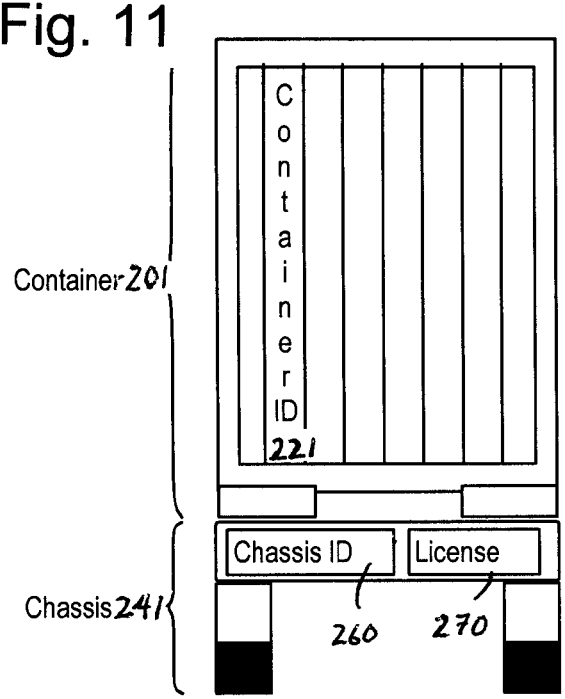
FIG. 11 illustrates some examples of the indicators for containers and chassis.

FIG. 11 shows examples of the indicator that includes a container indicator 221 on the side of the container 201 as well as a chassis identifier 260 of the chassis 241 and a license plate 270 of the chassis. In many situations, the container indicator 221 may be found on the front side, the backside (as shown in this Figure), the left side, the right side (as shown in FIG. 1), the top and the bottom of the container 201. The license plate 270 is often only found on the backside of the chassis as shown in this Figure. The chassis indicator is usually found only on the backside (as shown in this Figure), the left side and the right side (as shown in FIG. 10).

Figure 12:
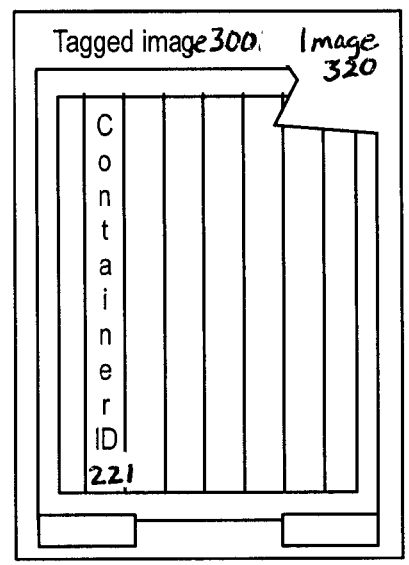
FIG. 12 shows the tagged image being used for an insurance estimate about the object, under an embodiment.

FIG. 12 shows the tagged image 300, in particular, the image 320 may be used for an insurance estimate about the object 81, shown here as a damaged container 201 that can be identified by the container indicator 221.

Figure 13:
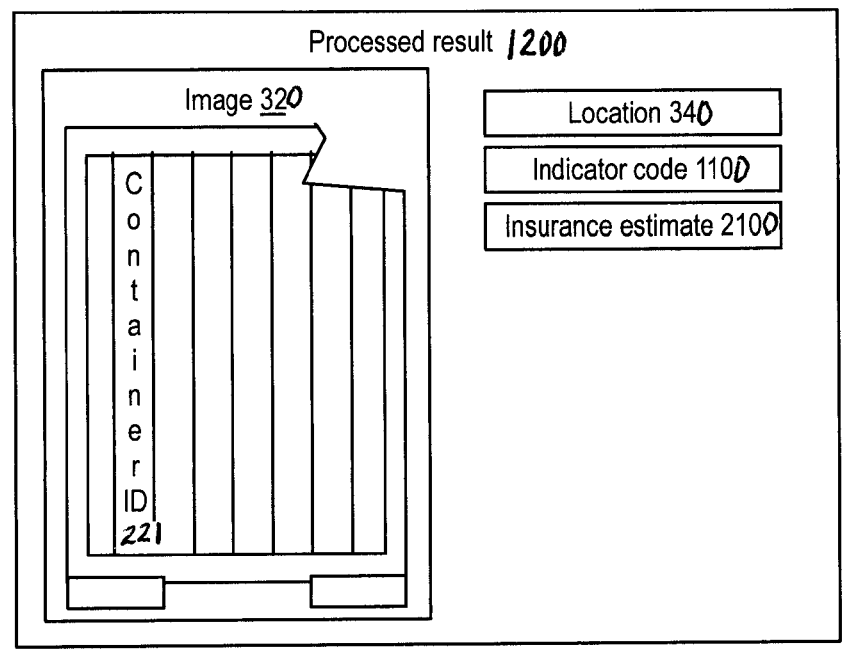
FIG. 13 shows how the insurance estimate and/or the image used for the estimate may also be included in the processed result.

FIG. 13 shows the processed result 1200 may include the insurance estimate 2100, indicator code 1100, and/or the image 320 used for the estimate.

Figure 14A:
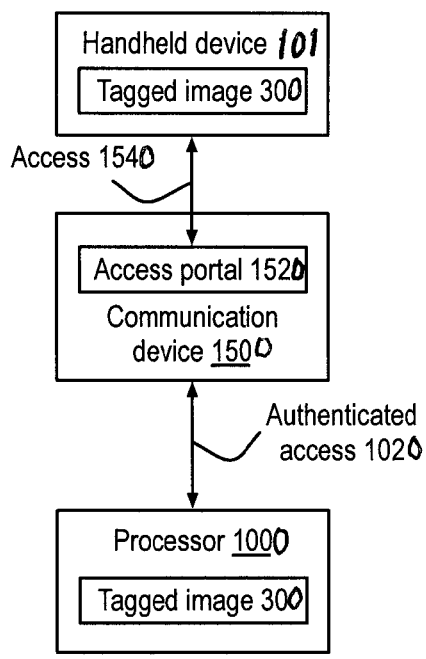
FIG. 14a shows a communication device configured to access the handheld device to send the tagged image to the processor to create the revenue, under an embodiment.
Figure 14B:
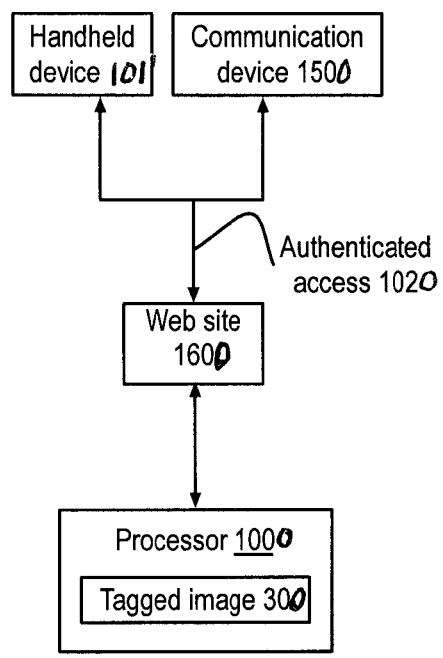
FIG. 14b shows an example web site that may be configured to provide the tagged image to the processor to create the revenue.

Various embodiments may implement the authenticated access 1020 differently. The processor 1000 may be configured to enable authenticated access for receipt of the tagged image 300 as shown in FIG. 10. FIG. 14a shows a communication device 1500 may be configured to access 1540 the handheld device 101 to send the tagged image 300 to the processor 1000. The communication device 1500 may use an access portal 1520 to access the handheld device 101. FIG. 14b shows a web site 1600 that may be used to provide the tagged image 300 to the processor 1000. In any of these embodiments, the tagged image 300 may be created.

Figure 14C:
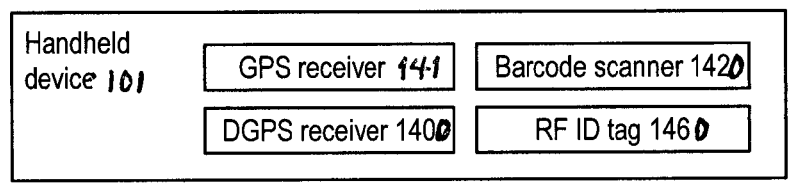
FIG. 14c shows a handheld device that may include any combination of the Global Positioning System (GPS) receiver, under an embodiment.

FIG. 14c shows the handheld device may include any combination of the Global Positioning System (GPS) receiver 141, a Differential GPS (DGPS) receiver 1400, a barcode scanner 1420 and/or a Radio Frequency Identification (RF-ID) tag 1460, to at least partly create the location 340. In certain embodiments, the barcode scanner may use the imaging device 120 of FIG. 10 to acquire a version of the location. This may be aid in locating chassis 241 and/or containers 201 that may be stacked in positions that are not readily determined by GPS coordinates, as will be shown in certain examples below.

FIG. 15a shows some examples of communication components that may be included in the handheld device 101 or of the communication device 1500. These examples include, but are not limited to, a cellular phone 1600, a cellular base station 1520, a Local Area Network (LAN) client, a LAN router, a Wireless LAN (WLAN) client 1680, a WLAN access point 1700, a Bluetooth client 1720 and/or a Bluetooth host 1740.

FIG. 15b shows some examples of an access portal 1500 that may be used by the communication device 1500 to access 1540 the tagged image 300. The access portal may be compatible with a version of at least one of a Universal Serial Bus (USB) protocol 1800, a Firewire protocol 1820, and a SATA protocol 1840.

FIG. 16a shows some examples of the components of the processor 1000, the web site 1600 and/or the database 2000. The processor, the web site and/or the database may include at least one instance of at least one member of an implementation group consisting of members of a Finite State Machine (FSM) 3100, an Inferential Engine (Inf Eng) 3120, a neural network 3140 and a computer 3160 instructed 3180 by a program system 3200 residing in at least one memory 3220, with at least one of the members contributing to at least partly create and/or use the processed result.

FIG. 16b shows some examples of the database 2000, a computer readable memory 2100, a disk drive 2120, and/or a server 2140, that may be configured to generate at least part of the program system 3200 in the processor 1000. The database, the computer readable memory, the disk drive and/or the server may further include an installation package 2160 configured to instruct the computer 3160 to install at least part of the program system in the processor. As used herein, the installation package may include any combination of source code, compiled modules possibly implemented as linkable libraries, and compressed versions of the program system components. These installation packages and/or the database, the computer readable memory, the disk drive and/or the server may deliver the installation package and/or the program system 3200 to at least partly contribute to the revenue 3000, the second revenue 3020 and/or the third revenue 3040 of FIG. 10.

As used herein, a finite state machine 3100 may receive at least one input, maintain at least one state and generate at least one output based upon the value of at least one of the inputs and/or at least one of the states. As used herein, an inferential engine 3120 maintains a list of inference rules and a list of facts, to which hypotheses may be presented to determine the consistency or inconsistency of the hypothesis to the facts based upon the rules of inference. As used herein, a neural network maintains a list of neural states and a synaptic network connecting those neural states, which may be presented stimulus to trigger changes in those neural states based upon the stimulus as transferred through the synaptic network. As used herein, a computer 3160 includes at least one instruction processor and at least one data processor with each of the data processors instructed by at least one of the instruction processor based upon the program system in accord with the various embodiments of this invention, which include but are not limited to the processor 1000, the web site 1600, the database 2000, the computer readable memory 2100, the disk drive 2120 and/or the server 2140. Note that in some embodiments the server 2140 may support at least part of the web site 1600.

Figure 17:
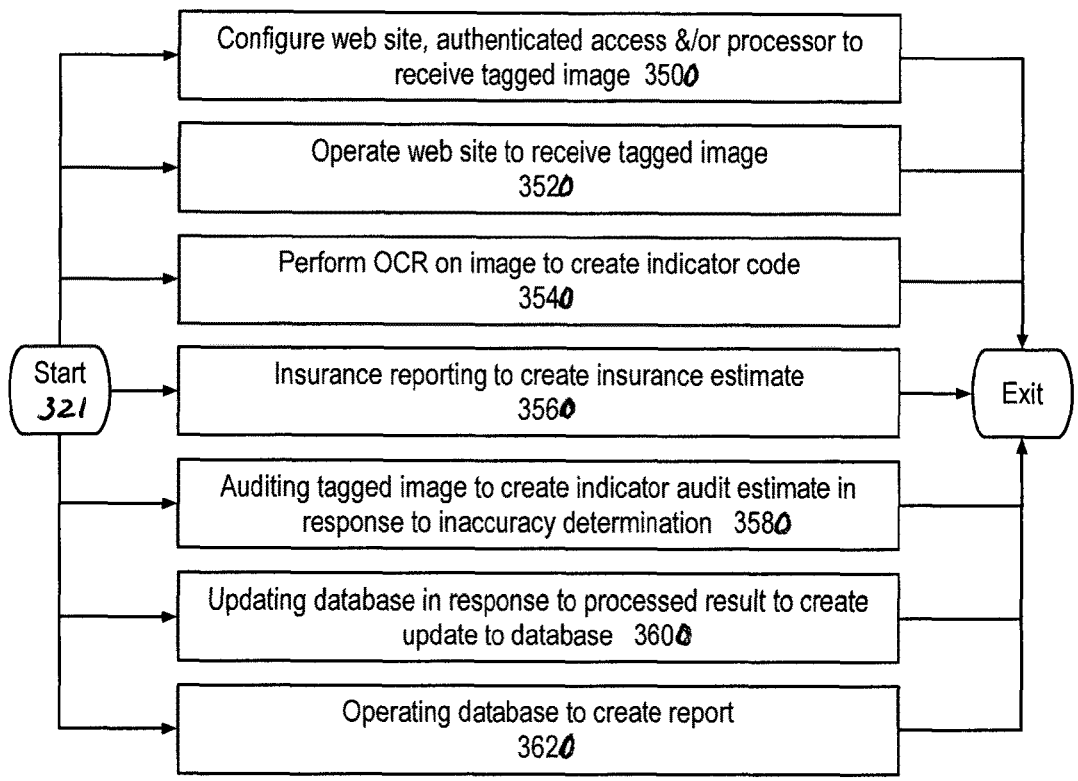
FIG. 17 is a flowchart showing an example of the details of a program system, under an embodiment.

FIG. 17 is a flowchart of some details of the program system 3200 instructing the processor 1000, under an embodiment. These flowcharts show some method embodiments, which may include arrows signifying a flow of control and/or state transitions as well as sometimes position data, supporting various implementations. These may include a program operation, or program thread, executing upon the computer 1040 or states of the finite state machine 1020. Each of these program steps may at least partly support the operation to be performed. The operation of starting 321 a flowchart refers to entering a subroutine or a macroinstruction sequence in the computer or of a possibly initial state or condition of the finite state machine. The operation of termination in a flowchart refers to completion of those operations, which may result in a subroutine return in the computer or possibly return the finite state machine to a previous condition or state. A rounded box with the word "Exit" in it denotes the operation of terminating a flowchart.

FIG. 17 shows an example of the details of the program system 3200 of FIGS. 16A and 16B. The program system may include at least one of the following program steps:

Program step 3500 supports configuring the web site 1600, the authenticated access 1020, and/or the processor 1000, for the processor to receive the tagged image 300. Program step 3520 supports operating the web site 1600 to receive the tagged image 300. Program step 3540 supports performing the OCR on the image 320 to create the indicator code 1100. Program step 3560 supports insurance reporting at least one insurance image included in the tagged image 300 to contribute to creating an insurance estimate 2100 of the object 81. Program step 3580 supports auditing 1300 the tagged image 300 to further create the indicator audit estimate 1320 in response to an inaccuracy determination of the indicator code 1100 of the image 320. Program step 3600 supports updating a database 2000 of the object 81 in response to the processed result 1200 to create an update of the database. Program step 3620 supports operating the database 2000 to create the report 2200 of the object 81 based upon the indicator code 1100 and/or the location 340.

Figure 18:
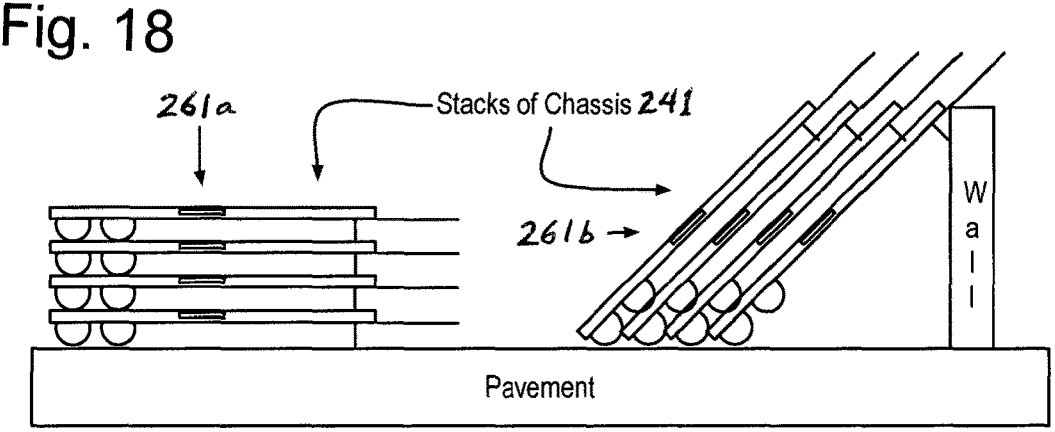
FIG. 18 shows some details of the storage of the chassis that may be reported by the database and recorded by the handheld device.

FIG. 18 shows some details of the storage of the chassis 241 that may be reported by the database 2000 and recorded by the handheld device 101. The chassis may be stacked vertically or near-vertically 261b, or stacked horizontally 261a. In both situations, there is a limited ability for any form of GPS readings to clearly designate the locations of the chassis in either stack, and the operator 60 of the handheld device 101 may use a bar code scanner 1420 to read-off locations in a stack, or to locate the stack in a storage yard or transfer facility.

Embodiments of a handheld imaging system may be used in a camera automation system using OCR technology that allows operators of the system to carry a digital camera with a GPS receiver (or similar geo-location system) on it, which they use to take pictures of the chassis number, or other identifier of a container or transport element. These cameras may use a technique known as geotagging to mark the GPS coordinates on the image so that the digital image of the chassis number is paired to a GPS position within the container yard or other site. For sites that have specific racks or locations of chassis, a unique identifier such as a bar code or number on a sheet of paper, can be imaged at the start of the row so the chassis are paired to a specific row within a site. These images can then be uploaded to a server, which allow for the container number to be read by an OCR system, and then displayed to the user or other operator.

Figure 19:
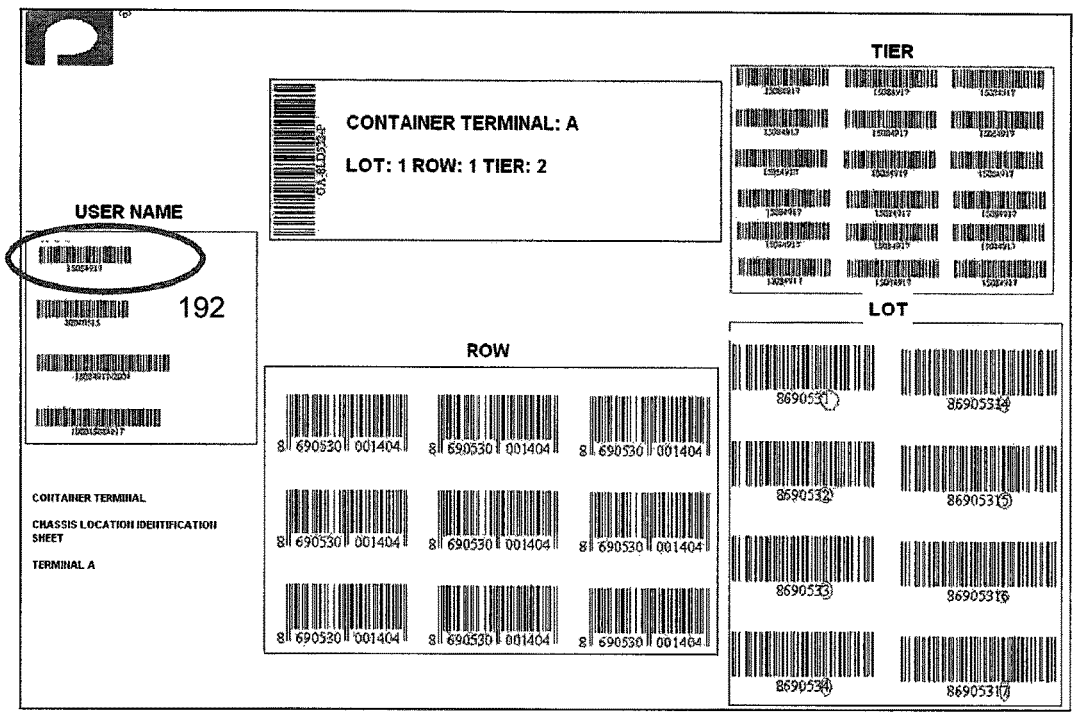
FIG. 19 illustrates a set of barcodes representing unique storage locations for a container location processing system, under an embodiment.

In an embodiment, the handheld imaging system allows site personnel to walk the areas where chassis are stacked with a supplied digital camera that is able to embed a GPS position into the image to create a tagged image, such as tagged image 300 in FIG. 12. A "geotagging" camera with a GPS receiver can be used to embed GPS coordinates into the images that are taken. A camera can also be a cellular phone with a camera built into it. If a cellular phone is used, the image data can be transmitted to the server directly from the cellular phone. For sites that store chassis in specific rows or locations and require this level of location detail, the procedure can be modified slightly. For example, at the start of the row or area to be imaged, the user will take a picture of a barcode (or other unique ID) that is used to indicate the specific row. The barcode or unique ID is on either a sheet of paper (which has a barcode assigned to each row on the page) or affixed to a location in the area/row of containers to be imaged. FIG. 19 shows an example sheet 192 containing a barcode 192 that could be used for identify containers in rows. Each barcode on the sheet 192 represents a unique location where chassis (or other objects) are stored within the container yard or site. This allows specific chassis to be located to specific rows or areas of the site.

Using this system, an entire site can be processed to provide an inventory of the chassis located at the site. For example, when the imaging is done for the row, the camera operator can close the row by taking a picture of an "end of row" barcode/identifier. This process is continued until all of the containers are imaged in each specific row. When geotagging or barcoding is used, this technique can also be used to identify other information at the start of an imaging session, which may include user name, row, lot, tier (height) information related to the chassis/container numbers captured. In an embodiment, the image is tagged with certain metadata in a defined format. Such metadata may include the following data fields, among others: camera manufacturer data, image orientation and resolution, software version, date/time, exposure and imaging data, flash configuration, pixel configuration, GPS location coordinates, and other appropriate data. Such metadata may be provided in any appropriate file format, such as an .EXIF data.

Once the means of locating the chassis has been started (either with a unique barcode/ID Number and/or geotagging); the chassis number is recorded via a digital camera, and may be stored in the camera as an image 320, such as shown in FIG. 12. This eliminates the need to manually enter the chassis number into a handheld device or write it onto a pad, which requires further data entry later. As the image is taken, the GPS position of the chassis is recorded and embedded into the image by the camera with GPS ability. This technique of imaging the chassis can be used not only for stacked chassis but also for any chassis or container in the terminal. Once processed or stored, the image may be OCR imaged so that a representation of the chassis number or identifier may be stamped on the image for easy viewing or further processing. Any appropriate camera or digital imaging device that has the requisite imaging capability, storage and processing power, and GPS features may be used. Additionally, the camera may include other features, such as a zoom feature which allows for capturing chassis numbers from a distance and allows the operator of the camera to have to get too close to the chassis stacks which is a safety hazard. Similarly, a flash or fixed LED lamp can be used for night illumination of the chassis numbers in darkness and low light condition.

When all chassis are imaged at the site, the images can be downloaded from the camera memory (e.g., flash card on the camera) and sent to the server, which may be installed at the terminal site or at a remote location that is accessed via an Internet connection. These images can be downloaded via a USB cable, a Wi-Fi or Bluetooth connection built into the camera, a cellular broadband connection, or any other appropriate transmission means.

In an embodiment, the image is tagged with certain information to produce a geotagged image. The following data can be used to tag the image: an image of the chassis number, the GPS Position Data, the image time and date information; a unique identifier (barcode, unique ID, or fiducial) that identifies a specific area the chassis is stored in, a user name for the imaging process (stored in a barcode or unique ID) that is imaged at the start of the imaging session, location information (e.g., lot, row tier information that is imaged at the start of the imaging session, imaging conditions, and any other camera specific or site specific information.

When the server processes the images for OCR, the following image processing functions may be applied: the image is rotated, shifted or scaled if required, the contrast and white balance are adjusted on the image to enhance the OCR result, or any other appropriate image processing. The OCR engine then accesses the image to extract the chassis number. The OCR result may be overlaid on the original image in contrasting (e.g., orange) text and/or it may be sent to the server for indexing, storage or further processing. When the server has finished applying OCR processing to the image, the result may published to a website with the geographic position (from the geotagged or unique barcode data) on a map interface (e.g., Google maps or equivalent). The data can also be sent directly to another remote database or server for tracking of the chassis asset.

FIG. 20 illustrates a web page displaying data map location of a chassis location of a chassis imaged at a site, under an embodiment. The web page image 195 includes several image locations including a map region 196 in which red "pushpins" or other indicators on the map represent the locations of the chassis, an OCR data region 198 with a table that shows the location information, and in which each row 197 in the table represents a chassis and is numbered to the corresponding number on the red pushpin in the map image. FIG. 20 is intended to provide an illustration of one possible configuration of a web page showing number and location information for geotagged container and/or chassis images. Other configurations are also possible, such as the type of map overlay, the format of the table, the type of data illustrated, and so on.

In an embodiment, the OCR result for the chassis may be further processed by the server, and/or sent to another system as needed. In certain cases, the imaging process, or the OCR process may not return clear or comprehensible images. In an embodiment, chassis numbers that cannot be resolved by the OCR process can be corrected by a camera or image audit system. This system allows the user to view a close up of the image and correct the image by manually entering the chassis number as seen in the image. The system may provide at least two ways a user can manually audit or correct an image. Either correction through a web browser and an Internet connection or an application-based audit client, though others are also possible. In a web-based audit system, for a chassis image with a chassis number that was not read correctly by the OCR system, the user can enter the corrected number into a text box that is provided through the interface below. The system can be configured to flag an incorrect or suspected number and prompt the user for review and correction. The user then enters corrected OCR result in the appropriate box or location. The application based audit client window can provide the same functionality for correcting images that have no OCR results or a wrong OCR result of a container chassis, but instead of a web-based interface, a separate client, server, or device application interface is provided.

In an embodiment, the handheld camera system may be operated by a user walking, cycling, or otherwise moving around a site manually taking still or video pictures with a digital camera. If a video system is employed separate imaging processing may be used to convert the video frames to stills and isolate the frame or frames that represent snapshots of containers or other images being processed. In an embodiment, the digital camera may be embodied in a smartphone that includes camera and GPS functionality, along with the ability to run applications and access the Internet through a web browser interface. Such a device may be embodied as a phone, tablet, mini-tablet, mini-notebook, PDA or other appropriate handheld device that is sufficiently portable for use by an operator moving around a site. The phone may also be configured or have an installed application that can read bar codes or other visual codes that may encode the identifier. Such a device may also be used at certain pre-defined locations, such as gates, hubs, intersections within a site to routinely image, process and transmit identifier information to the server.

Top-Handler/RTG OCR

In one embodiment, the camera system may be installed on tophandlers or front end loaders for capturing containers as they are put or pulled at the bombcart, chassis, or railcar height to stack or chassis. In this embodiment, the image capture platform is a tophandler (a forklift type machine, or a rubber tire/rail gantry crane (a crane on rail or rubber wheels for moving containers). The image data is sent to the server over the Internet (or Intranet if hosted locally), from this mounted camera. Using such a tophandler OCR system, inventory can be updated as follows: the top-handler OCR process performs a container pull from UTR/Chassis/Bombcart/Drayman to stack, the driver starts the Tophandler. Cameras installed on the tophandler image the side of the container on the UTR/Chassis/Bombcart/Drayman, GPS installed on the mast provides location information and a PTIU installed on the equipment captures spreader height and twistlock status. The PTIU stands for 'Position Tracking Interface Unit' and is a custom designed controller for determining terminal equipment state such as (but not limited to) height of container, width of container, and twistlock status, and may be implemented as a microcontroller or similar processing device mounted on a piece of transport equipment, such as a crane or container handler, but that may also be located remotely from the equipment. When a UTR bombcart, chassis, or drayman drives underneath the tophandler/RMG/RTG, the system images the side of the container when the twistlocks go to LAND and LOCK status and the container is at the correct height such that the container number is in the correct field of view of the camera to image. The PTIU installed on the Tophandler determines the right container height to image and to only image the container when the twistlocks are LOCKED. The container must be locked and lifted to image, and it is imaged at the bombcart/railcar/chassis height. When the container is placed in a stack of containers, the container height and cell locations are recorded by the PTIU. This image data is sent to the server system and OCR is performed on the captured images. If the image is unreadable, it is sent to the audit client for correction and container number identification by an operator or by an automated process. Once the image data is OCR processed and confirmed, the final container placement location and OCR result is updated in the system database. The system can then send a message to the terminal operator or other entity with location of container. The UTR/Chassis/Bomb Cart Unique ID number may also be identified by a camera OCR/Container identification system at the time of container pull event to associate the container being lost from that UTR/Chassis/Bomb Cart, In the case of a container pull from the stack to a UTR/Chassis/Bombcart/Drayman, the process may proceed as follows: the tophandler/RTG operator pulls a requested container from stack location, the PTIU senses container pull event and determines the row, bay, cell tier location of the container; based on row, bay, cell, tier, the system accesses the database to locate container in stack and retrieves the container number from the database. As the container is placed on a waiting Chassis/Bombcart/Drayman from a Tophandler/RTG, the container is imaged on the side of the container once again as a double verification. The TOS inventory system is updated with container placement (on UTR/Chassis/Bombcart/Drayman from stack in yard). The UTR/Chassis/Bomb Cart Unique ID number may also be identified with an Camera/OCR system at the time of container put to the UTR/Chassis/Bomb Cart event to associate the container being associated with to that UTR/Chassis/Bomb Cart, For a container stack-to-stack reposition operation (i.e., moving a container from a different location in a stack to another location, the process may proceed as follows: the Tophandler/RMG/RTG operator pulls container from stack location, the PTIU senses container pull event and determines the row, bay, cell tier of the container pulled. Based on row, bay, cell tier, the process uses the database to locate container in stack and retrieves the container number from the database. The driver of Tophandler/RTG/RMG then puts container in a new stack position (it is not put on a UTR or Drayman truck so cameras are not used in this case). The PTIU records put location of container, and the database updates the location of container and sends message of the new container location. In this case, no OCR maybe performed it is based purely on container put and pull location as determined by the GPS and PTIU.

In the case of a container pull from a UTR/Chassis/Bombcart/Drayman to a rail car, the process may proceed as follows: the tophandler driver pulls a container from a UTR/Chassis/Bombcart/Drayman. When a UTR bombcart, chassis, or drayman drives underneath the Tophandler/RTG/RMG, the system images the side of the container when the twistlocks LAND and LOCK. The UTR/Chassis/Bomb Cart Unique ID number may also be identified with a camera and OCR system at the time of container pull event to associate the container being lost from that UTR/Chassis/Bomb Cart, The PTIU installed on the Tophandler determines the right container height to image such that the container number is in the field of view of the camera for OCR recognition. The container must be locked and lifted to image and is imaged at the bombcart/railcar/chassis height (typically 11-20 ft). When the container is placed on a railcar, GPS on tophandler/RTG/RMG sets this as a put to rail message. The tier (height of the container on the rail car is recorded. Railcars typically store containers up to two high). Note that rules may need to be enforced to ensure that the train is parked in the same location every time. The image data is sent to the server and OCR processed. If the image is unreadable, it is sent to the audit client. Once the image data is OCR processed and confirmed, the final container placement location is set as put to rail in the database, and a message may be sent indicating the location of the container on rail. The railcar maybe identifiable via a radio tag or unique identification number which will also allow for the container to be located to a specific rail road car on a train track.

In the case of a container pull from railcar to a UTR/Chassis/Bombcart/Drayman, the process may proceed as follows: the tophandler/RTG/RMG driver pulls a container from a railcar. When the container is placed on a UTR/Chassis/Bombcart/Drayman, a put to drayman/UTR message is created. The container is imaged at the UTR height and container number is read. This image data is sent to the server and OCR processed. If the image is unreadable, it is sent to the audit client. Once the image data is OCR processed and confirmed the system sends a message with location of container (on UTR, in yard). The UTR/Chassis/Bomb Cart Unique ID number may also be identified with an Camera/OCR system at the time of container put to the UTR/Chassis/Bomb Cart event to associate the container being put to/associated with to that UTR/Chassis/Bomb Cart, The geotagging/OCR process may also be used in conjunction with container transport using RTG, RMG, or straddle carrier equipment. In this embodiment, a camera system is installed on cranes to capture containers as they are pulled on and off of bombcarts and chassis and placed into container stacks and/or from container stack to chassis/bombcart. This case is similar to the top-handler embodiment described above, except that the image capture platform is a Rubber Tire Gantry (RTG) Crane, Rail Mounted Gantry (RMG) Crane, or other straddle carrier equipment. In this case, all imaging and other data is sent to the server over the Internet from the cameras or imaging equipment.

In the RTG/RMG OCR case, inventory is updated using the following process: for an RTG/RMG container pull from UTR/Chassis/Bombcart/Drayman to the stack, the driver starts the RTG/RMG, in an embodiment, there are two cameras installed by each truck lane on the RTG/RMG (both sides, four cameras total) at the container height level designed to read the front and back of the container. When a UTR bombcart, chassis, or drayman drives under the truck lane of the RTG/RMG, the system images the front and back container number of the container as it is on the UTR/Drayman. The system may also image the sides of the chassis identification number if the container is on a chassis to indicate container pull from a specific chassis. The PTIU installed on the RTG/RMG and tells container lock/pull from UTR/Drayman. When the RTG/RMG places the container on the stack, the system receives get a put message from the PTIU, which tells exactly where the container was placed (tier, row, cell). The bay location is determined by two GPS's installed on the RTG/RMG, and the OCR system sends a message with the location of the container.

In the case of a container PULL from the stack to UTR/Chassis/Bombcart/Drayman in the RTG/RMG system: the driver pulls container from stack location, the PTIU senses container pull event and determines row, bay, cell, tier. Based on the row, bay, cell, tier; the system locates container in stack and retrieves the container number from the database. As the container is placed on a waiting UTR or Chassis, container is imaged by the cameras once again as a double verification. The server updates with container movement (on UTR, in yard). The system may also image the sides of the chassis identification number if the container is on a chassis to indicate container put to the waiting chassis that receives the container.

In the case of a container reposition stack-to-stack in the RTG system, such as moving a container from a different location in a stack to another location, the process proceeds as follows: the driver pulls container from stack location. The PTIU senses container pull event and the system determines the row, bay, cell, tier. Based on the row, bay, cell, tier, the system locates the container in stack and retrieves the container number from the database. The driver of the RTG puts the container in a new stack position (it is not put on a UTR or Drayman truck so cameras are not used in this case). The PTIU records put location of container, and the database updates the location of container and sends message of the new container location.

The systems described above can be extended to or implemented within a variety of other container or object transport systems, such as ship-based transport using quay cranes, bus-based transport using forklifts, and other similar systems.

Mobile Inventory Vehicle System

In an embodiment, the images used for geotagging container images may be generated by a mobile imaging unit, such as a car or truck upon which appropriate imaging devices are mounted. In such a case, the vehicle may be driven around a lot while an operator directly or remotely controls the camera to shoot photos or videos of the objects to be imaged. The camera on such a device may be synchronized to shoot pictures at regular intervals as the vehicle passes the objects. The vehicle may also be implemented as an operator-less robot or other remote controlled mobile device. Such as system may be embodied as a mobile inventory vehicle (MIV) system in which a vehicle captures parked container and chassis IDs in a site every second (or other period of time) while driving at e.g., 5-10 mph (or faster) down parked rows of containers. The vehicle may include an on-board server or computer that performs certain imaging and/or tagging or transmission operations. In an embodiment, the on-board vehicle computer may be configured to transmit the digital image data from the camera(s) to the remote server, for OCR processing, or it may be configured to perform the OCR processing locally. The OCR data may need to be normalized according to numbering conventions, and the system may be configured to accommodate both non-standard and standard ISO container/chassis numbers. In this case, the system may include an OCR engine that determines whether international or domestic (e.g., domestic U.S. containers and chassis) numbers are being used. The vehicle may also include other computers that perform certain tasks, such as writing the data to memory (e.g., RAM disk, local hard drive storage, optical drive storage, etc.), providing GPS or enhanced GPS, or other location information to the data for geotagging with the image. Certain calibration systems, such as parking spot cameras may be used to allow an operator to verify that the MIV cameras and GPS system are operating properly and the container/chassis is parked in the space as determined by the GPS systems. Additional technology such as LED lamps, defrosters, and windshield wipers maybe included to allow for the system to operate in a variety of lighting and weather conditions.

In an embodiment of the MIV system, two (or more) cameras may be used to provide images of different views of the object (i.e. one camera for chassis, one for container imaging), different angles of the same view of the object, images of the object using different focus or exposure settings, or other cooperative images. Certain other technology may also be used to enhance the processing, such as the use of lasers or other imaging to determine whether or not a parking spot is empty, whether or not a container is present on top of a chassis (as in the case of a bare-chassis), or the height of a container stack, among others.

In general, the camera-based OCR and geotagging system provides several advantages over present systems. For example, such as system can capture chassis number data much faster than manually writing or entering the numbers; the process can be used on containers, chassis, license plates, anything with uniform characters to be imaged and transcribed to digital text; the system is safer in that it allows the user to remain in the safe environment of a vehicle, reduces the requirement for users to be right next to or on containers, chassis, and other heavy equipment that can fall and injure the personnel in the yard; likewise, it reduces exposure to time required on-site in the dangerous terminal environment and to harsh weather conditions, which can reduce the risk of injury due to falling or slipping on wet or icy pavement. In this system, containers that cannot be read by the OCR system can still be entered manually with the audit client application, and processing can occur in a centralized office, which provides a safer and more environmentally friendly environment. The audit system can be run anywhere where there is an Internet or network connection, and does not require the person to be present at the site. The geotagging process allows the system to automatically locate the container and/or chassis and display on a map image, and allows for locating the container and/or chassis without having to enter a specific location, as well as for real time inventory control of container and/or chassis. The system can image license plates, containers, chassis anywhere in the terminal where there are defined parking zones of equipment with license plates, containers and chassis.

Although embodiments have been described with regard to the tracking of container chassis, this system is not limited to imaging chassis but could also be used for license plates, container numbers, or any item that requires inventory control. For example, the MIV system may be used for reading license plates on parked cars in shopping malls, airports, etc, such as for security purposes or for finding stolen vehicles "dumped" at airports, malls, etc., or to locate lost vehicles, such as when someone texts their car license plate to a number and the location is returned. The mobile phone embodiment can be used for tracking warehouse (or similar confined environment) inventory, etc. A barcode or unique ID inside warehouse would be used to locate the equipment (as a GPS signal would not be in range inside a building for location tracking). It could also be used to implement a low cost "gate OCR" system, in which an operator stands at a kiosk or gate as containers on chassis or vehicles enter a parking lot or port and images the license plate, chassis number, markings, damage (e.g., tire damage), or container number, before they enter the yard. This provides a cost-effective alternative to having a comprehensive installed gate system with cameras and wiring installed at the site.

It should be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media. Embodiments may also include cloud-based computing networks in which certain processing or data storage tasks are provided through tenant-based client/server network systems. In such an embodiment, image caching processes may be used to provide fast and safe access to particular users, such as inventory or site control managers who store image data on the cloud-based servers. Internet-based servers may also be used to reduce the necessity to use physical hardware or network interfaces at the site. The network may be cellular based to reduce the need to utilize terminal Wi-Fi networks. Hosting the server on the Internet allows containers to be tracked without any network at the imaging site required other than for an Internet connection.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements

What is claimed is:

1. An apparatus, comprising:
    an imaging device configured to take a picture of an object, the picture containing an alphanumeric identifier of the object;
    a global positioning system (GPS) component associated with the imaging device and configured to tag the image of the object with GPS location information of the object to generate a tagged image;
    a communications interface configured to transmit the tagged image to a server computer remote from the imaging device over an Internet Protocol (IP) network; and
    a processor of the server configured to perform Optical Character Recognition (OCR) on the picture and to create an indicator code corresponding to the identifier of the object, wherein the processor is further configured to create a processed result containing the indicator code and the location to locate the object within a site.

2. The apparatus of claim 1 wherein the object comprises a container of at least twenty feet long and a chassis configured to carry at least one containers, and wherein the tagged image comprises metadata including the identifier and information of the container or of handling equipment of the container.

3. The apparatus of claim 1 wherein the imaging device comprises a handheld smartphone comprising a camera and a telecommunications interface.

4. The apparatus of claim 3 wherein the GPS component comprises a circuit resident in the smartphone.

5. The apparatus of claim 1, wherein the imaging device is a camera mounted on a mobile vehicle configured to drive around the site.

6. The apparatus of claim 1, wherein said processor is configured to receive said tagged image through a web site.

7. The apparatus of claim 6 wherein the tagged image is displayed and processed in a web page displaying location information of the object in the site.

8. The apparatus of claim 7 wherein the web page comprises a plurality of display areas showing the location of the object relative to a map of the site and a description of the location relative to defined coordinates of the site.

9. The apparatus of claim 8 further comprising an audit process providing display area configured to allow a user to correct an identifier processed by the OCR in the event of an error character recognition.

10. The apparatus of claim 2 wherein the site comprises a container storage and transport terminal, and wherein the imaging device is mounted on at least one of: a front end loader, top-handler, a rubber tire gantry crane, and a rail-mounted gantry crane.

11. The apparatus of claim 2 wherein the imaging device is mounted at a gate location of the site for imaging container transport vehicles as they enter or exit the site.

12. A method comprising:
    receiving an image captured by an image capture device of an object within a defined site, the image containing a unique identifier of the object;
    determining a geographical location of the object within the site relative;
    embedding the location of the object with the image of the object to create a tagged image;
    receiving the tagged image from the image capture device over an Internet Protocol (IP) network; and performing Optical Character Recognition (OCR) of the identifier in the image to create an indicator code including the image and the location of the object.

13. The method of claim 12 wherein the object comprises a container of at least twenty feet long and a chassis configured to carry at least one containers, and wherein the tagged image comprises metadata including the identifier and information of the container or of handling equipment of the container.

14. The method of claim 12 wherein the imaging device comprises a handheld smartphone comprising a camera and a telecommunications interface.

15. The method of claim 14 wherein the GPS component comprises a circuit resident in the smartphone.

16. The method of claim 12, wherein the imaging device is a camera mounted on a mobile vehicle configured to drive around the site.

17. The method of claim 12, wherein said processor is configured to receive said tagged image through a web site.

18. The method of claim 17 wherein the tagged image is displayed and processed in a web page displaying location information of the object in the site.

19. The method of claim 18 wherein the web page comprises a plurality of display areas showing the location of the object relative to a map of the site and a description of the location relative to defined coordinates of the site.

20. The method of claim 19 further comprising an audit process providing display area configured to allow a user to correct an identifier processed by the OCR in the event of an error character recognition.

* * * * *